United States Patent
Todeschini

(10) Patent No.: US 9,811,650 B2
(45) Date of Patent: Nov. 7, 2017

(54) USER AUTHENTICATION SYSTEM AND METHOD

(71) Applicant: Hand Held Products, Inc., Fort Mill, SC (US)

(72) Inventor: Erik Todeschini, Camillus, NY (US)

(73) Assignee: Hand Held Products, Inc., Fort Mill, SC (US)

( * ) Notice: Subject to any disclaimer, the term of this patent is extended or adjusted under 35 U.S.C. 154(b) by 0 days.

(21) Appl. No.: 14/983,637

(22) Filed: Dec. 30, 2015

(65) Prior Publication Data

US 2016/0188861 A1    Jun. 30, 2016

Related U.S. Application Data

(60) Provisional application No. 62/098,458, filed on Dec. 31, 2014.

(51) Int. Cl.
| | | |
|---|---|---|
| *G06F 21/32* | (2013.01) | |
| *G06K 9/00* | (2006.01) | |
| *G06F 3/0481* | (2013.01) | |
| *G06F 1/16* | (2006.01) | |
| *G06F 3/0484* | (2013.01) | |

(Continued)

(52) U.S. Cl.
CPC ............. *G06F 21/32* (2013.01); *G06F 1/163* (2013.01); *G06F 3/011* (2013.01); *G06F 3/017* (2013.01); *G06F 3/041* (2013.01); *G06F 3/04815* (2013.01); *G06F 3/04845* (2013.01); *G06F 3/16* (2013.01); *G06F 21/629* (2013.01); *G06F 21/83* (2013.01); *G06K 9/00355* (2013.01)

(58) Field of Classification Search
CPC ........ G06F 21/32; G06F 21/83; G06F 21/629; G06F 3/16; G06F 3/041; G06F 3/017; G06F 3/011; G06F 3/04815; G06F 1/163; G06F 3/04845; G06K 9/00214; G06K 9/00355

See application file for complete search history.

(56) References Cited

U.S. PATENT DOCUMENTS

| | | | |
|---|---|---|---|
| 6,832,725 B2 | 12/2004 | Gardiner et al. | |
| 7,128,266 B2 | 10/2006 | Zhu et al. | |

(Continued)

FOREIGN PATENT DOCUMENTS

| | | | |
|---|---|---|---|
| WO | 2013163789 A1 | 11/2013 | |
| WO | 2013173985 A1 | 11/2013 | |

(Continued)

OTHER PUBLICATIONS

U.S. Appl. No. 13/367,978, filed Feb. 7, 2012, (Feng et al.); now abandoned.

(Continued)

*Primary Examiner* — Michael Pyzocha
(74) *Attorney, Agent, or Firm* — Additon, Higgins & Pendleton, P.A.

(57) ABSTRACT

A user authentication system includes an augmented reality device with a gesture analyzer configured for recognizing a user's gestures. The augmented reality device also includes an object renderer in communication with the gesture analyzer. The object renderer is configured for (i) rendering a virtual three-dimensional object for display to the user (ii) modifying the shape of the virtual three-dimensional object based upon the recognized gestures.

20 Claims, 10 Drawing Sheets

(51) Int. Cl.
*G06F 21/83* (2013.01)
*G06F 21/62* (2013.01)
*G06F 3/01* (2006.01)
*G06F 3/16* (2006.01)
*G06F 3/041* (2006.01)

(56) References Cited

U.S. PATENT DOCUMENTS

| | | |
|---|---|---|
| 7,159,783 B2 | 1/2007 | Walczyk et al. |
| 7,413,127 B2 | 8/2008 | Ehrhart et al. |
| 7,726,575 B2 | 6/2010 | Wang et al. |
| 8,294,969 B2 | 10/2012 | Plesko |
| 8,317,105 B2 | 11/2012 | Kotlarsky et al. |
| 8,322,622 B2 | 12/2012 | Liu |
| 8,366,005 B2 | 2/2013 | Kotlarsky et al. |
| 8,371,507 B2 | 2/2013 | Haggerty et al. |
| 8,376,233 B2 | 2/2013 | Van Horn et al. |
| 8,381,979 B2 | 2/2013 | Franz |
| 8,390,909 B2 | 3/2013 | Plesko |
| 8,408,464 B2 | 4/2013 | Zhu et al. |
| 8,408,468 B2 | 4/2013 | Horn et al. |
| 8,408,469 B2 | 4/2013 | Good |
| 8,424,768 B2 | 4/2013 | Rueblinger et al. |
| 8,448,863 B2 | 5/2013 | Xian et al. |
| 8,457,013 B2 | 6/2013 | Essinger et al. |
| 8,459,557 B2 | 6/2013 | Havens et al. |
| 8,469,272 B2 | 6/2013 | Kearney |
| 8,474,712 B2 | 7/2013 | Kearney et al. |
| 8,479,992 B2 | 7/2013 | Kotlarsky et al. |
| 8,490,877 B2 | 7/2013 | Kearney |
| 8,517,271 B2 | 8/2013 | Kotlarsky et al. |
| 8,523,076 B2 | 9/2013 | Good |
| 8,528,818 B2 | 9/2013 | Ehrhart et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van Horn et al. |
| 8,556,177 B2 | 10/2013 | Hussey et al. |
| 8,558,759 B1 * | 10/2013 | Prada Gomez ......... G06F 3/017 345/156 |
| 8,559,767 B2 | 10/2013 | Barber et al. |
| 8,561,895 B2 | 10/2013 | Gomez et al. |
| 8,561,903 B2 | 10/2013 | Sauerwein |
| 8,561,905 B2 | 10/2013 | Edmonds et al. |
| 8,565,107 B2 | 10/2013 | Pease et al. |
| 8,571,307 B2 | 10/2013 | Li et al. |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 8,740,082 B2 | 6/2014 | Wilz |
| 8,740,085 B2 | 6/2014 | Furlong et al. |
| 8,746,563 B2 | 6/2014 | Hennick et al. |
| 8,750,445 B2 | 6/2014 | Peake et al. |
| 8,752,766 B2 | 6/2014 | Xian et al. |
| 8,756,059 B2 | 6/2014 | Braho et al. |
| 8,757,495 B2 | 6/2014 | Qu et al. |
| 8,760,563 B2 | 6/2014 | Koziol et al. |
| 8,763,909 B2 | 7/2014 | Reed et al. |
| 8,777,108 B2 | 7/2014 | Coyle |
| 8,777,109 B2 | 7/2014 | Oberpriller et al. |
| 8,779,898 B2 | 7/2014 | Havens et al. |
| 8,781,520 B2 | 7/2014 | Payne et al. |
| 8,783,573 B2 | 7/2014 | Havens et al. |
| 8,789,757 B2 | 7/2014 | Barten |
| 8,789,758 B2 | 7/2014 | Hawley et al. |
| 8,789,759 B2 | 7/2014 | Xian et al. |
| 8,794,520 B2 | 8/2014 | Wang et al. |
| 8,794,522 B2 | 8/2014 | Ehrhart |
| 8,794,525 B2 | 8/2014 | Amundsen et al. |
| 8,794,526 B2 | 8/2014 | Wang et al. |
| 8,798,367 B2 | 8/2014 | Ellis |
| 8,807,431 B2 | 8/2014 | Wang et al. |
| 8,807,432 B2 | 8/2014 | Van Horn et al. |
| 8,819,812 B1 * | 8/2014 | Weber .................... G06F 3/017 726/18 |
| 8,820,630 B2 | 9/2014 | Qu et al. |
| 8,822,848 B2 | 9/2014 | Meagher |
| 8,824,692 B2 | 9/2014 | Sheerin et al. |
| 8,824,696 B2 | 9/2014 | Braho |
| 8,842,849 B2 | 9/2014 | Wahl et al. |
| 8,844,822 B2 | 9/2014 | Kotlarsky et al. |
| 8,844,823 B2 | 9/2014 | Fritz et al. |
| 8,849,019 B2 | 9/2014 | Li et al. |
| D716,285 S | 10/2014 | Chaney et al. |
| 8,851,383 B2 | 10/2014 | Yeakley et al. |
| 8,854,633 B2 | 10/2014 | Laffargue |
| 8,866,963 B2 | 10/2014 | Grunow et al. |
| 8,868,421 B2 | 10/2014 | Braho et al. |
| 8,868,519 B2 | 10/2014 | Maloy et al. |
| 8,868,802 B2 | 10/2014 | Barten |
| 8,868,803 B2 | 10/2014 | Caballero |
| 8,870,074 B1 | 10/2014 | Gannon |
| 8,879,639 B2 | 11/2014 | Sauerwein |
| 8,880,426 B2 | 11/2014 | Smith |
| 8,881,983 B2 | 11/2014 | Havens et al. |
| 8,881,987 B2 | 11/2014 | Wang |
| 8,903,172 B2 | 12/2014 | Smith |
| 8,908,995 B2 | 12/2014 | Benos et al. |
| 8,910,870 B2 | 12/2014 | Li et al. |
| 8,910,875 B2 | 12/2014 | Ren et al. |

(56) References Cited

U.S. PATENT DOCUMENTS

| | | | |
|---|---|---|---|
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | El Akel et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| D733,112 S | 6/2015 | Chaney et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,082,023 B2 | 7/2015 | Feng et al. |
| 9,224,022 B2 | 12/2015 | Ackley et al. |
| 9,224,027 B2 | 12/2015 | Van Horn et al. |
| D747,321 S | 1/2016 | London et al. |
| 9,230,140 B1 | 1/2016 | Ackley |
| 9,250,712 B1 | 2/2016 | Todeschini |
| 9,258,033 B2 | 2/2016 | Showering |
| 9,262,633 B1 | 2/2016 | Todeschini et al. |
| 9,310,609 B2 | 4/2016 | Rueblinger et al. |
| D757,009 S | 5/2016 | Oberpriller et al. |
| 9,342,724 B2 | 5/2016 | McCloskey |
| 9,375,945 B1 | 6/2016 | Bowles |
| D760,719 S | 7/2016 | Zhou et al. |
| 9,390,596 B1 | 7/2016 | Todeschini |
| D762,604 S | 8/2016 | Fitch et al. |
| D762,647 S | 8/2016 | Fitch et al. |
| 9,412,242 B2 | 8/2016 | Van Horn et al. |
| D766,244 S | 9/2016 | Zhou et al. |
| 9,443,123 B2 | 9/2016 | Hejl |
| 9,443,222 B2 | 9/2016 | Singel et al. |
| 9,478,113 B2 | 10/2016 | Xie et al. |
| 2007/0063048 A1 | 3/2007 | Havens et al. |
| 2008/0020733 A1* | 1/2008 | Wassingbo .............. G06F 3/017 455/411 |
| 2009/0134221 A1 | 5/2009 | Zhu et al. |
| 2009/0202115 A1* | 8/2009 | Dennard ............ G06K 9/00093 382/125 |
| 2009/0293119 A1* | 11/2009 | Jonsson .................. G06F 21/36 726/19 |
| 2010/0052851 A1* | 3/2010 | Kaehler .................. G06F 3/017 340/5.81 |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2011/0061100 A1* | 3/2011 | Mattila .................. G06F 3/017 726/17 |
| 2011/0110581 A1* | 5/2011 | Yang .................. G06K 9/00201 382/154 |
| 2011/0162066 A1* | 6/2011 | Kim ...................... G06F 3/017 726/18 |
| 2011/0169999 A1 | 7/2011 | Grunow et al. |
| 2011/0202554 A1 | 8/2011 | Powilleit et al. |
| 2012/0111946 A1 | 5/2012 | Golant |
| 2012/0162257 A1* | 6/2012 | Kim ...................... H04L 63/123 345/633 |
| 2012/0168512 A1 | 7/2012 | Kotlarsky et al. |
| 2012/0193423 A1 | 8/2012 | Samek |
| 2012/0203647 A1 | 8/2012 | Smith |
| 2012/0223141 A1 | 9/2012 | Good et al. |
| 2013/0043312 A1 | 2/2013 | Van Horn |
| 2013/0075168 A1 | 3/2013 | Amundsen et al. |
| 2013/0175341 A1 | 7/2013 | Kearney et al. |
| 2013/0175343 A1 | 7/2013 | Good |
| 2013/0182897 A1* | 7/2013 | Holz .................. G06K 9/00711 382/103 |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0287258 A1 | 10/2013 | Kearney |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedrao |
| 2013/0307964 A1 | 11/2013 | Bremer et al. |
| 2013/0308625 A1 | 11/2013 | Park et al. |
| 2013/0313324 A1 | 11/2013 | Koziol et al. |
| 2013/0313325 A1 | 11/2013 | Wilz et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008439 A1 | 1/2014 | Wang |
| 2014/0025584 A1 | 1/2014 | Liu et al. |
| 2014/0034734 A1 | 2/2014 | Sauerwein |
| 2014/0035819 A1 | 2/2014 | Griffin |
| 2014/0036848 A1 | 2/2014 | Pease et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0061306 A1 | 3/2014 | Wu et al. |
| 2014/0063289 A1 | 3/2014 | Hussey et al. |
| 2014/0066136 A1 | 3/2014 | Sauerwein et al. |

(56) References Cited

U.S. PATENT DOCUMENTS

| | | |
|---|---|---|
| 2014/0067692 A1 | 3/2014 | Ye et al. |
| 2014/0070005 A1 | 3/2014 | Nahill et al. |
| 2014/0071041 A1* | 3/2014 | Fujimaki ............ G02B 27/0172 345/156 |
| 2014/0071840 A1 | 3/2014 | Venancio |
| 2014/0074746 A1 | 3/2014 | Wang |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0098792 A1 | 4/2014 | Wang et al. |
| 2014/0100774 A1 | 4/2014 | Showering |
| 2014/0100813 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Giordano et al. |
| 2014/0104451 A1 | 4/2014 | Todeschini et al. |
| 2014/0106594 A1 | 4/2014 | Skvoretz |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0124577 A1 | 5/2014 | Wang et al. |
| 2014/0124579 A1 | 5/2014 | Ding |
| 2014/0125574 A1* | 5/2014 | Scavezze ................ G06F 21/31 345/156 |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131438 A1 | 5/2014 | Kearney |
| 2014/0131441 A1 | 5/2014 | Nahill et al. |
| 2014/0131443 A1 | 5/2014 | Smith |
| 2014/0131444 A1 | 5/2014 | Wang |
| 2014/0131445 A1 | 5/2014 | Ding et al. |
| 2014/0131448 A1 | 5/2014 | Xian et al. |
| 2014/0133379 A1 | 5/2014 | Wang et al. |
| 2014/0136208 A1 | 5/2014 | Maltseff et al. |
| 2014/0140585 A1 | 5/2014 | Wang |
| 2014/0151453 A1 | 6/2014 | Meier et al. |
| 2014/0152882 A1 | 6/2014 | Samek et al. |
| 2014/0158770 A1 | 6/2014 | Sevier et al. |
| 2014/0159869 A1 | 6/2014 | Zumsteg et al. |
| 2014/0160003 A1* | 6/2014 | Follis .................... G06F 1/1694 345/156 |
| 2014/0166755 A1 | 6/2014 | Liu et al. |
| 2014/0166757 A1 | 6/2014 | Smith |
| 2014/0166759 A1 | 6/2014 | Liu et al. |
| 2014/0168787 A1 | 6/2014 | Wang et al. |
| 2014/0175165 A1 | 6/2014 | Havens et al. |
| 2014/0175172 A1 | 6/2014 | Jovanovski et al. |
| 2014/0191644 A1 | 7/2014 | Chaney |
| 2014/0191913 A1 | 7/2014 | Ge et al. |
| 2014/0197238 A1 | 7/2014 | Liu et al. |
| 2014/0197239 A1 | 7/2014 | Havens et al. |
| 2014/0197304 A1 | 7/2014 | Feng et al. |
| 2014/0203087 A1 | 7/2014 | Smith et al. |
| 2014/0204268 A1 | 7/2014 | Grunow et al. |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0230045 A1* | 8/2014 | Choi ...................... G06F 21/36 726/19 |
| 2014/0231500 A1 | 8/2014 | Ehrhart et al. |
| 2014/0232930 A1 | 8/2014 | Anderson |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0270196 A1 | 9/2014 | Braho et al. |
| 2014/0270229 A1 | 9/2014 | Braho |
| 2014/0278387 A1 | 9/2014 | DiGregorio |
| 2014/0282210 A1 | 9/2014 | Bianconi |
| 2014/0284384 A1 | 9/2014 | Lu et al. |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0312121 A1 | 10/2014 | Lu et al. |
| 2014/0319220 A1 | 10/2014 | Coyle |
| 2014/0319221 A1 | 10/2014 | Oberpriller et al. |
| 2014/0326787 A1 | 11/2014 | Barten |
| 2014/0332590 A1 | 11/2014 | Wang et al. |
| 2014/0344943 A1 | 11/2014 | Todeschini et al. |
| 2014/0346233 A1 | 11/2014 | Liu et al. |
| 2014/0351317 A1 | 11/2014 | Smith et al. |
| 2014/0353373 A1 | 12/2014 | Van Horn et al. |
| 2014/0361073 A1 | 12/2014 | Qu et al. |
| 2014/0361082 A1 | 12/2014 | Xian et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0001304 A1 | 1/2015 | Todeschini |
| 2015/0003673 A1 | 1/2015 | Fletcher |
| 2015/0009338 A1 | 1/2015 | Laffargue et al. |
| 2015/0009610 A1 | 1/2015 | London et al. |
| 2015/0014416 A1 | 1/2015 | Kotlarsky et al. |
| 2015/0021397 A1 | 1/2015 | Rueblinger et al. |
| 2015/0028102 A1 | 1/2015 | Ren et al. |
| 2015/0028103 A1 | 1/2015 | Jiang |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0040378 A1 | 2/2015 | Saber et al. |
| 2015/0048168 A1 | 2/2015 | Fritz et al. |
| 2015/0049347 A1 | 2/2015 | Laffargue et al. |
| 2015/0051992 A1 | 2/2015 | Smith |
| 2015/0053766 A1 | 2/2015 | Havens et al. |
| 2015/0053768 A1 | 2/2015 | Wang et al. |
| 2015/0053769 A1 | 2/2015 | Thuries et al. |
| 2015/0062366 A1 | 3/2015 | Liu et al. |
| 2015/0063215 A1 | 3/2015 | Wang |
| 2015/0063676 A1 | 3/2015 | Lloyd et al. |
| 2015/0069130 A1 | 3/2015 | Gannon |
| 2015/0071819 A1 | 3/2015 | Todeschini |
| 2015/0083800 A1 | 3/2015 | Li et al. |
| 2015/0086114 A1 | 3/2015 | Todeschini |
| 2015/0088522 A1 | 3/2015 | Hendrickson et al. |
| 2015/0096872 A1 | 4/2015 | Woodburn |
| 2015/0099557 A1 | 4/2015 | Pettinelli et al. |
| 2015/0100196 A1 | 4/2015 | Hollifield |
| 2015/0102109 A1 | 4/2015 | Huck |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0129659 A1 | 5/2015 | Feng et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0136854 A1 | 5/2015 | Lu et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0144701 A1 | 5/2015 | Xian et al. |
| 2015/0149946 A1 | 5/2015 | Benos et al. |
| 2015/0154394 A1* | 6/2015 | Kapinos .................. G06F 21/31 726/19 |
| 2015/0161429 A1 | 6/2015 | Xian |
| 2015/0169075 A1* | 6/2015 | Peixoto .................. G06F 3/017 345/173 |
| 2015/0169925 A1 | 6/2015 | Chen et al. |
| 2015/0169929 A1 | 6/2015 | Williams et al. |
| 2015/0186703 A1 | 7/2015 | Chen et al. |
| 2015/0193644 A1 | 7/2015 | Kearney et al. |
| 2015/0193645 A1 | 7/2015 | Colavito et al. |
| 2015/0199957 A1 | 7/2015 | Funyak et al. |
| 2015/0204671 A1 | 7/2015 | Showering |
| 2015/0205358 A1* | 7/2015 | Lyren .................... G06F 3/0484 715/765 |

(56) References Cited

U.S. PATENT DOCUMENTS

| | | |
|---|---|---|
| 2015/0210199 A1 | 7/2015 | Payne |
| 2015/0220753 A1 | 8/2015 | Zhu et al. |
| 2015/0254485 A1 | 9/2015 | Feng et al. |
| 2015/0327012 A1 | 11/2015 | Bian et al. |
| 2016/0014251 A1 | 1/2016 | Hejl |
| 2016/0019378 A1* | 1/2016 | Chan ............... G06F 3/04815 726/5 |
| 2016/0040982 A1 | 2/2016 | Li et al. |
| 2016/0042241 A1 | 2/2016 | Todeschini |
| 2016/0057230 A1 | 2/2016 | Todeschini et al. |
| 2016/0091964 A1* | 3/2016 | Iyer ............... G02B 27/017 345/633 |
| 2016/0109219 A1 | 4/2016 | Ackley et al. |
| 2016/0109220 A1 | 4/2016 | Laffargue |
| 2016/0109224 A1 | 4/2016 | Thuries et al. |
| 2016/0112631 A1 | 4/2016 | Ackley et al. |
| 2016/0112643 A1 | 4/2016 | Laffargue et al. |
| 2016/0124516 A1 | 5/2016 | Schoon et al. |
| 2016/0125217 A1 | 5/2016 | Todeschini |
| 2016/0125342 A1 | 5/2016 | Miller et al. |
| 2016/0125873 A1 | 5/2016 | Braho et al. |
| 2016/0133253 A1 | 5/2016 | Braho et al. |
| 2016/0162677 A1* | 6/2016 | Kohlenberg ......... G06F 3/0484 726/19 |
| 2016/0171720 A1 | 6/2016 | Todeschini |
| 2016/0178479 A1 | 6/2016 | Goldsmith |
| 2016/0180678 A1 | 6/2016 | Ackley et al. |
| 2016/0189087 A1 | 6/2016 | Morton et al. |
| 2016/0227912 A1 | 8/2016 | Oberpriller et al. |
| 2016/0232891 A1 | 8/2016 | Pecorari |
| 2016/0275283 A1* | 9/2016 | de Leon ............ G06F 3/04815 |
| 2016/0292477 A1 | 10/2016 | Bidwell |
| 2016/0294779 A1 | 10/2016 | Yeakley et al. |
| 2016/0306769 A1 | 10/2016 | Kohtz et al. |
| 2016/0314276 A1 | 10/2016 | Wilz, Sr. et al. |
| 2016/0314294 A1 | 10/2016 | Kubler et al. |

FOREIGN PATENT DOCUMENTS

| | | |
|---|---|---|
| WO | 2014019130 A1 | 2/2014 |
| WO | 2014110495 A1 | 7/2014 |

OTHER PUBLICATIONS

U.S. Appl. No. 14/277,337 for Multipurpose Optical Reader, filed May 14, 2014 (Jovanovski et al.); 59 pages; now abandoned.

U.S. Appl. No. 14/446,391 for Multifunction Point of Sale Apparatus With Optical Signature Capture filed Jul. 30, 2014 (Good et al.); 37 pages; now abandoned.

U.S. Appl. No. 29/516,892 for Table Computer filed Feb. 6, 2015 (Bidwell et al.); 13 pages.

U.S. Appl. No. 29/523,098 for Handle for a Tablet Computer filed Apr. 7, 2015 (Bidwell et al.); 17 pages.

U.S. Appl. No. 29/528,890 for Mobile Computer Housing filed Jun. 2, 2015 (Fitch et al.); 61 pages.

U.S. Appl. No. 29/526,918 for Charging Base filed May 14, 2015 (Fitch et al.); 10 pages.

U.S. Appl. No. 14/715,916 for Evaluating Image Values filed May 19, 2015 (Ackley); 60 pages.

U.S. Appl. No. 29/525,068 for Tablet Computer With Removable Scanning Device filed Apr. 27, 2015 (Schulte et al.); 19 pages.

U.S. Appl. No. 29/468,118 for an Electronic Device Case, filed Sep. 26, 2013 (Oberpriller et al.); 44 pages.

U.S. Appl. No. 29/530,600 for Cyclone filed Jun. 18, 2015 (Vargo et al); 16 pages.

U.S. Appl. No. 14/707,123 for Application Independent DEX/UCS Interface filed May 8, 2015 (Pape); 47 pages.

U.S. Appl. No. 14/283,282 for Terminal Having Illumination and Focus Control filed May 21, 2014 (Liu et al.); 31 pages; now abandoned.

U.S. Appl. No. 14/705,407 for Method and System to Protect Software-Based Network-Connected Devices From Advanced Persistent Threat filed May 6, 2015 (Hussey et al.); 42 pages.

U.S. Appl. No. 14/704,050 for Intermediate Linear Positioning filed May 5, 2015 (Charpentier et al.); 60 pages.

U.S. Appl. No. 14/705,012 for Hands-Free Human Machine Interface Responsive to a Driver of a Vehicle filed May 6, 2015 (Fitch et al.); 44 pages.

U.S. Appl. No. 14/715,672 for Augumented Reality Enabled Hazard Display filed May 19, 2015 (Venkatesha et al.); 35 pages.

U.S. Appl. No. 14/735,717 for Indicia-Reading Systems Having an Interface With a User's Nervous System filed Jun. 10, 2015 (Todeschini); 39 pages.

U.S. Appl. No. 14/702,110 for System and Method for Regulating Barcode Data Injection Into a Running Application on a Smart Device filed May 1, 2015 (Todeschini et al); 38 pages.

U.S. Appl. No. 14/747,197 for Optical Pattern Projector filed Jun. 23, 2015 (Thuries et al.); 33 pages.

U.S. Appl. No. 14/702,979 for Tracking Battery Conditions filed May 4, 2015 (Young et al.); 70 pages.

U.S. Appl. No. 29/529,441 for Indicia Reading Device filed Jun. 8, 2015 (Zhou et al.); 14 pages.

U.S. Appl. No. 14/747,490 for Dual-Projector Three-Dimensional Scanner filed Jun. 23, 2015 (Jovanovski et al); 40 pages.

U.S. Appl. No. 14/740,320 for Tactile Switch for a Mobile Electronic Device filed Jun. 16, 2015 (Bamdringa); 38 pages.

U.S. Appl. No. 14/740,373 for Calibrating a volume Dimensioner filed Jun. 16, 2015 (Ackley et al.); 63 pages.

\* cited by examiner

USER AUTHENTICATION SYSTEM AND METHOD

CROSS-REFERENCE TO RELATED APPLICATION

The present application claims the benefit of U.S. Provisional Patent Application No. 62/098,458 for a Method of User Authentication Via Virtual Object Manipulation filed on Dec. 31, 2014, which is hereby incorporated by reference in its entirety.

FIELD OF THE DISCLOSURE

The disclosure relates generally to information systems, and more particularly, to a user authentication system for authenticating a user in a computer environment and a method of authenticating a user in a computer environment.

BACKGROUND OF THE DISCLOSURE

There are many different systems and methods for authenticating a user in a computer environment (e.g., authenticating a user for a computer environment). Authenticating a user in a computer environment generally involves providing the user with the appropriate permission to access some or all of the features of a computerized device such as a computer terminal, mobile device (e.g., cell phone, smartphone, tablet computer, wearable computer, etc.), or permission to access a particular application hosted on a local or remote computer (e.g., an application service provider or cloud application), or to access a website or other information repository. These known methods typically involve the utilization of a username or user identification (e.g., user ID) and traditional alphanumeric passwords, PINS, "captcha" data entry, picture passwords, two-dimensional (2D) pattern tracing, among others.

As vision-based, hands-free input and display devices gain more traction in mainstream computing environments, there will be a growing need for systems and methods to authenticate users that do not rely on the traditional two-dimensional display and manual text entry schemes.

SUMMARY OF THE DISCLOSURE

In one aspect, the present disclosure embraces a user authentication system for authenticating a user in a computer environment. The user authentication system includes an augmented reality device. The augmented reality device includes a gesture analyzer configured for recognizing a user's gestures. The augmented reality device also includes an object renderer in communication with the gesture analyzer. The object renderer is configured for (i) rendering a virtual three-dimensional object for display to the user (ii) modifying the shape of the virtual three-dimensional object based upon the recognized gestures. The user authentication system also includes an authentication database for storing an authentication object. The user authentication system also includes a verification subsystem in communication with the augmented reality device and the authentication database. The verification subsystem is configured for (i) receiving the virtual three-dimensional object having a modified shape from the object renderer and (ii) authenticating the user if the virtual three-dimensional object's modified shape matches the authentication object's shape.

In an exemplary embodiment, the gesture analyzer is a three-dimensional depth sensor configured for converting a user's hand gesture into an associated change in the shape of the virtual three-dimensional object.

In another exemplary embodiment, the gesture analyzer is configured to allow the user to make a plurality of modifications to the shape of the virtual three-dimensional object before the virtual three-dimensional object having a modified shape is transmitted to the verification subsystem.

In yet another exemplary embodiment, the verification subsystem authenticates the user by transmitting an authentication signal to the computer environment.

In yet another exemplary embodiment, the virtual three-dimensional object comprises a plurality of three-dimensional vertices, each of which is associated with a position. The authentication object comprises a plurality of three-dimensional vertices, each of which is associated with a position. The verification subsystem is configured to determine that the virtual three-dimensional object's modified shape matches the authentication object's shape if, for each vertex of the authentication object, there is a corresponding vertex of the virtual three-dimensional object vertex having the same position.

In yet another exemplary embodiment, the verification subsystem is configured to determine that the virtual three-dimensional object's modified shape matches the authentication object's shape if, for each of a predetermined percentage of vertices of the authentication object, there is a corresponding vertex of the virtual three-dimensional object vertex having the same position.

In yet another exemplary embodiment, the user authentication system includes an input device configured for receiving a user identification from the user, and the authentication object is associated with the user identification.

In yet another exemplary embodiment, the input device is a touchpad.

In yet another exemplary embodiment, the input device is a microphone.

In yet another exemplary embodiment, the shape of the virtual three-dimensional object initially rendered by the object renderer depends upon the user identification submitted by the user via the input device.

In another aspect, the disclosure embraces a user authentication system for authenticating a user in a computer environment that includes an augmented reality device, an input device, an authentication database, and a verification subsystem. The augmented reality device includes a gesture analyzer and an object renderer. The gesture analyzer is configured for recognizing a user's gestures. The object renderer is in communication with the gesture analyzer and is configured for (i) rendering a virtual three-dimensional object for display to the user (ii) modifying the shape of the virtual three-dimensional object based upon the recognized gestures. The input device is configured for receiving a user identification from the user. The authentication database stores an authentication object. The a verification subsystem is in communication with the augmented reality device, the input device, and the authentication database; and the verification subsystem is configured for (i) receiving the virtual three-dimensional object having a modified shape from the object renderer and (ii) authenticating the user if the virtual three-dimensional object's modified shape matches the authentication object. The authentication object is associated with the user identification. The gesture analyzer is configured to allow the user to make a plurality of modifications to the shape of the virtual three-dimensional object before the virtual three-dimensional object having a modified shape is transmitted to the verification subsystem. The virtual three-dimensional object comprises a plurality of three-dimensional vertices, each of which is associated with a position. The authentication object comprises a plurality of three-dimensional vertices, each of which is associated with a position. The verification subsystem is configured to determine that the virtual three-dimensional object's modified shape matches the authentication object's shape if, for each of a predetermined percentage of vertices of the authentication object, there is a corresponding vertex of the virtual three-dimensional object vertex having the same position.

In another aspect, the present disclosure embraces a method of authenticating a user in a computer environment. The method includes rendering a virtual three-dimensional object for display to the user via an augmented reality device's object renderer. The method also includes recognizing the user's gesture using an augmented reality device's gesture analyzer. The method also includes modifying the shape of the virtual three-dimensional object based upon the recognized gesture. The method also includes comparing, via a verification subsystem, the modified shape of the virtual three-dimensional object to an authentication object. The method also includes authenticating the user if the modified shape of the virtual three-dimensional object matches the authentication object.

In an exemplary embodiment, the gesture analyzer utilized in the method is a three-dimensional depth sensor configured for converting a user's hand gesture into an associated change in shape of the virtual three-dimensional object.

In another exemplary embodiment, modifying the shape of the virtual three-dimensional object based upon the recognized gesture includes making a plurality of modifications to the shape of the virtual three-dimensional object.

In another exemplary embodiment, the method's virtual three-dimensional object includes a plurality of three-dimensional vertices, each of which is associated with a position. The method's authentication object comprises a plurality of three-dimensional vertices, each of which is associated with a position.

In yet another exemplary embodiment, the verification subsystem utilized by the method is configured to determine that the virtual three-dimensional object's modified shape matches the authentication object's shape if, for each vertex of the authentication object, there is a corresponding vertex of the virtual three-dimensional object vertex having the same position.

In yet another exemplary embodiment, the verification subsystem utilized by the method is configured to determine that the virtual three-dimensional object's modified shape matches the authentication object if a pre-determined percentage of authentication object positions are the same as the virtual three-dimensional object positions.

In yet another exemplary embodiment, the method includes receiving a user identification via an input device, and the method's authentication object is associated with the user identification.

In yet another exemplary embodiment, the input device utilized by the method is a touchpad.

In yet another exemplary embodiment, the input device utilized by the method is a microphone.

DETAILED DESCRIPTION

The present disclosure embraces a novel system and method for authenticating a user in a computer environment using an augmented reality (AR) display device (e.g., augmented reality device) utilizing three-dimensional (3D) depth-sensing technology to display and virtually manipulate a virtual three-dimensional object. A virtual three-dimensional object is typically a rendering (e.g., drawing) of an object in a manner that provides the viewer (e.g., user) with a sense of the object's length, width, and depth.

Figure 1:
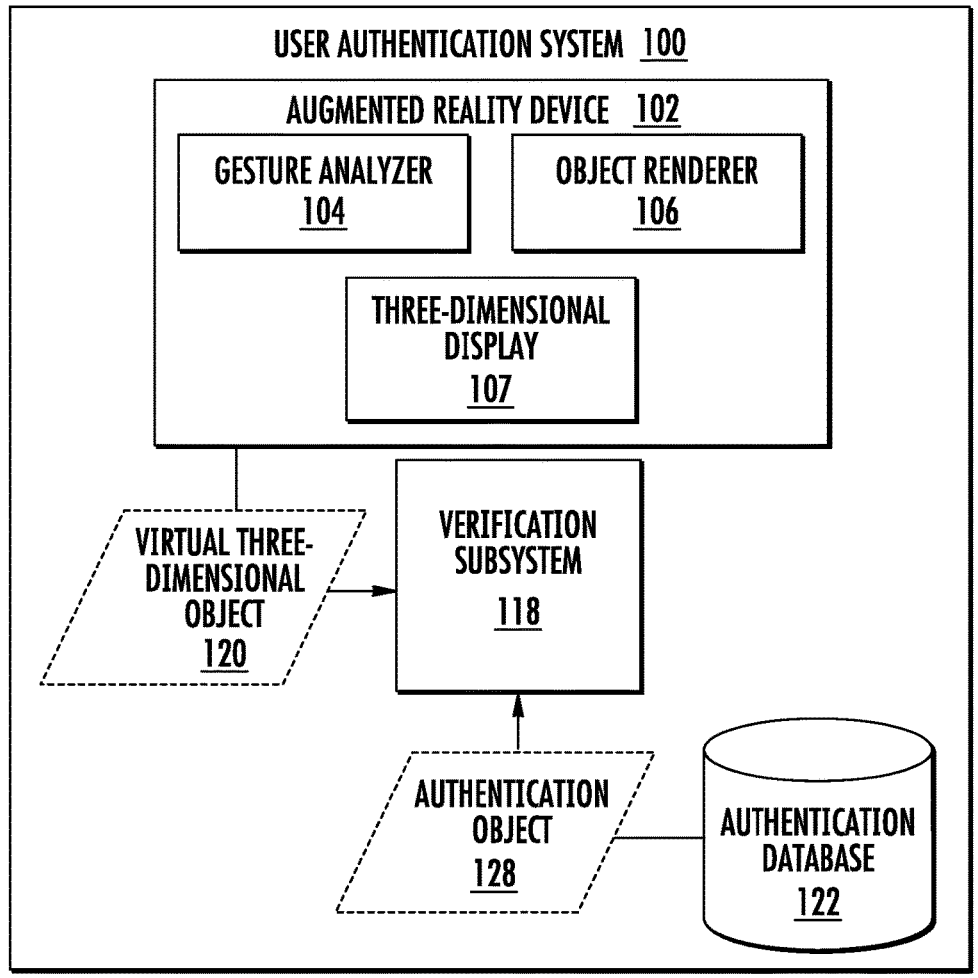
FIG. 1 is a block diagram of an exemplary user authentication system according to the present disclosure.
Figure 2:
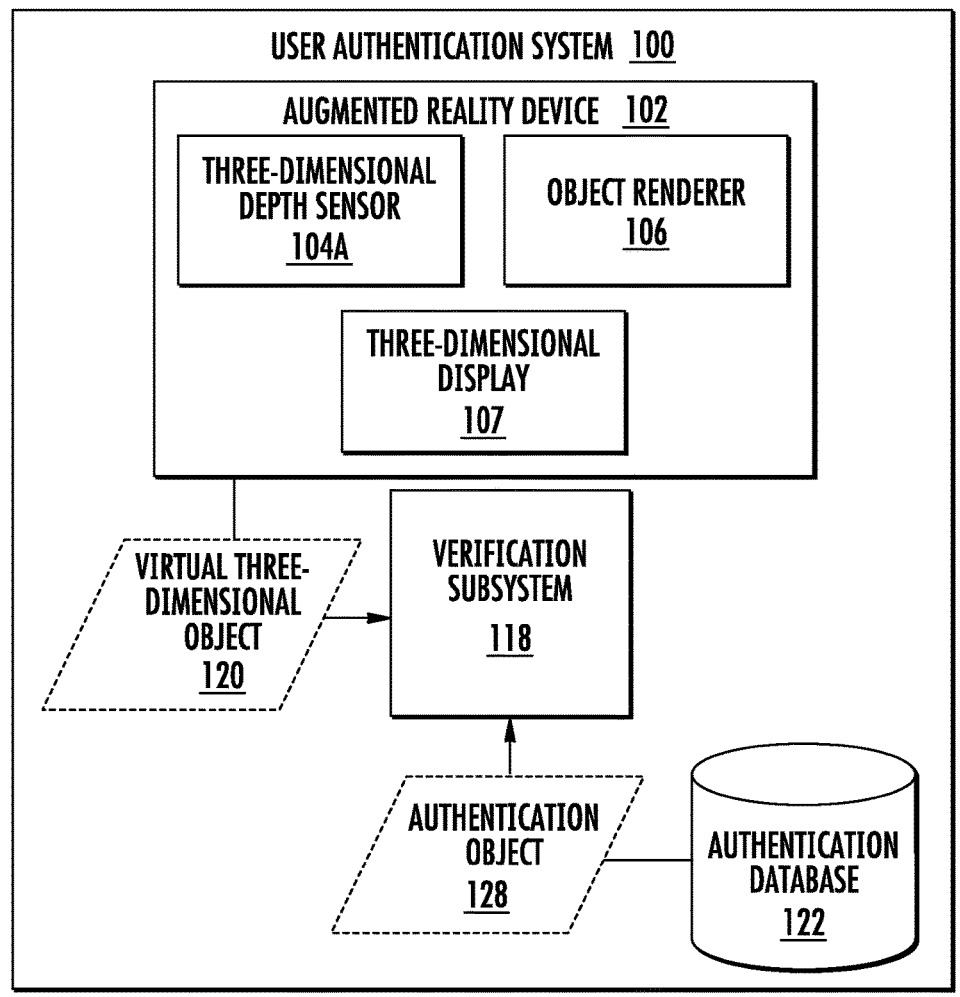
FIG. 2 is a block diagram of an alternative embodiment of an exemplary user authentication system according to the present disclosure.
Figure 5:
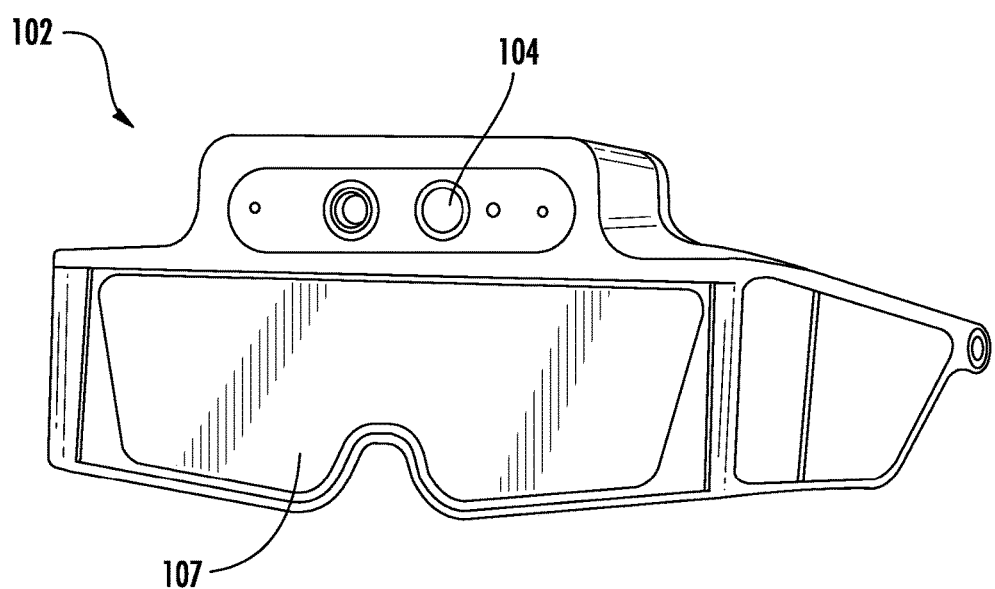
FIG. 5 is an exemplary augmented reality device of the system according to the present disclosure.

As shown in FIGS. 1 and 2, the user authentication system 100 typically includes an augmented reality device 102. Augmented reality devices come in many varieties, but typically include at least one processor, display, sensor, and input device. Augmented reality devices may incorporate or take the form of a head-mounted display (HMD), eye-glasses, a heads-up display (HUD), contact lenses, or a handheld device. FIG. 5 depicts an exemplary augmented reality device 102 that a user wears like eyeglasses. Augmented reality devices that incorporate a head-mounted display (e.g., augmented reality headset devices or augmented reality headsets), such as Meta Company's META 1™ or SPACEGLASSES™, typically provide the ability to display virtual three-dimensional objects directly within the line of sight of the user as well as the ability to interact with the virtual objects by using integrated three-dimensional time-of-flight sensors. This product's three-dimensional time-of-flight sensors are embedded within the augmented reality headset to sense a user's hand gestures.

The augmented reality device 102 typically includes a gesture analyzer 104. The gesture analyzer 104 is configured for recognizing a user's gestures. Typically, this involves the user placing his hands within the gesture analyzer's field of view and then performing a motion (or sequence of motions) that may be interpreted as a command by the gesture analyzer. For example, the user may extend his hand in front of his upper body and make a pinching motion with his index finger and thumb. The gesture analyzer 104 may, for example, recognize this gesture as a command to reduce the size of a particular image or part of an image, or to squeeze (e.g., condense, collapse) a part of the image. As will be discussed in greater detail, the present disclosure generally involves the virtual manipulation of an object. Consequently, the gesture analyzer 104 is typically configured to interpret hand and finger motions as being commands to manipulate (e.g., alter, reshape, reposition, etc.) an object. For example, a user extending an open palm and moving it repeatedly back and forth could serve as a command to flatten out a portion of the object. Other gestures which the gesture analyzer 104 may be configured to recognize include, by way of example and not intending to limit the disclosure in any way, pinching, stretching, rotating, smoothing, rounding, and cutting gestures.

As shown in FIG. 2, the gesture analyzer may be, or may include, a three-dimensional depth sensor 104A. The three-dimensional depth sensor 104A is typically configured for converting a user's hand gesture into an associated change in the shape of the virtual three-dimensional object being displayed to the user by the augmented reality device 102. The three-dimensional depth sensor 104A typically employs range imaging techniques to resolve distances between the three-dimensional depth sensor 104A and an object, such as a user's hands. For example, the three-dimensional depth sensor 104A may employ time-of-flight sensors that resolve distances based on the known speed of light.

The augmented reality device 102 typically includes an object renderer 106. The object renderer 106 is in communication with the gesture analyzer 104. The object renderer 106 is configured for rendering a virtual three-dimensional object 120 for display to the user. Typically, the object renderer 106 includes a rendering computer program (e.g., rendering program, 3D rendering program, 3D graphics program, etc.) stored in a memory. The rendering program is executable by a computer processor. The object renderer 106 may also include a graphics processing unit (GPU) to facilitate the rapid manipulation and alteration of displayed images, including the virtual three-dimensional object 120.

The object renderer 106 typically includes a three-dimensional display 107 for conveying to the user a sense of depth perception when viewing the displayed virtual three-dimensional object 120. Because the disclosure embraces an augmented reality environment, the three-dimensional display 107 typically allows a user to view virtual images (e.g., virtual objects) and real objects (e.g., a real time view of the user's actual surroundings) at the same time. More typically, the virtual images are integrated into the user's real-time view of the real world. The three-dimensional display 107 typically is a headset device, but it may be any type of device capable of displaying an image to a viewer in three dimensions. For example, the three-dimensional display 107 may be a display screen or a projector. The three-dimensional display 107 may incorporate any type of technology acceptable for displaying an image to a user in three dimensions, including holographic display, volumetric display, integral imaging, compressive light field, and the like.

The object renderer 106 is also configured for modifying the shape of the virtual three-dimensional object 120 based upon the recognized gestures. In other words, the object renderer 106 initially displays the virtual three-dimensional object 120 in a predetermined, unmodified shape (e.g., form). Upon receiving information (e.g., data) from the gesture analyzer 104 regarding the user's gesture(s), the object renderer 106 modifies (e.g., alters, changes, reshapes, etc.) the virtual three-dimensional object 120 in a manner associated with the particular gesture(s). Based on the gesture, the object renderer 106 redraws the shape of the virtual three-dimensional object 120 from its initial shape (e.g., initial object shape) to its modified shape (e.g., final object shape).

The initial shape of the virtual three-dimensional object 120, as displayed by the object renderer 106, is typically predetermined and may be as complex or as simple as desired. For example, the object renderer 106 may display a virtual three-dimensional object having a relatively complex initial shape, such as an artistic sculpture, or a piece of equipment or machinery. Alternatively, the object renderer 106 may display a virtual-three dimensional object 120 having a relatively basic initial shape, such as cube, sphere, pyramid, or cylinder.

Typically, the augmented reality device's object renderer 106 and gesture analyzer 104 are configured to work together to allow a user to make a plurality of modifications to the shape of the virtual three-dimensional object 120. In other words, the user is not typically limited to making just one gesture resulting in a single modification to the shape of the virtual three-dimensional object 120. Consider the example where the three-dimensional object 120 takes the initial shape of a sphere. The user may make a squeezing gesture with both palms open, and repeat that gesture a plurality of times until the sphere is flattened into an intermediate form (e.g., intermediate shape) of a disk. Then, the user may perform a series of cupping gestures to round out the edges of the disk to create a bowl shape representing the modified shape (e.g., final shape). This example is not intended to limit the disclosure in any way, and the actual number of gestures and modifications used in the authentication process may be many or few.

The user authentication system 100 also includes an authentication database 122. The authentication database 122 stores an authentication object 128 (e.g., authentication template). Typically, the authentication database 122 is stored in a storage medium such as a hard disk drive, solid-state drive, or similar data storage device. The authentication database 122 may be proximate to, or integral with, the augmented reality device 102. Alternatively, the authentication database 122 may be remote. For example, the authentication database 122 may be stored on a remote database server computer.

The authentication object 128 is a virtual representation of an object of a pre-determined shape. Typically, the shape of the authentication object 128 is predetermined by the user in the same way that an alphanumeric password would be predefined in any other type of authentication system (e.g., user login system). The authentication object 128 may have a simple or complex shape. By way of example and without limiting the disclosure in any way, an authentication object 128 may have the shape of an animal such as a fish, or an apparatus like a vase, chair, car, or hammer. Typically, the shape of the authentication object 128 is not so complex that a user could not easily and readily virtually form (e.g., mold, shape) the object using a relatively small number of hand gestures (e.g., less than about twenty hand gestures). To make it particularly difficult for an unauthorized person to crack the authentication process, the authentication object 128 may be so relatively complex that it requires a relatively large number of gestures to virtually shape the object (e.g., more than fifty separate gestures). Because three-dimensional objects, in general, can be reshaped in an infinite number of ways, the system according to the present disclosure can advantageously provide a very high level of security due to the statistical near-impossibility of a hacker guessing the shape of the authentication object.

The user authentication system 100 also includes a verification subsystem 118. The verification subsystem 118 is in communication with the augmented reality device 102 and the authentication database 122. The verification subsystem 118 may be communicatively connected to the augmented reality device 102 and the authentication database 122 in any acceptable wired or wireless manner sufficient to permit the transfer of data (e.g., computer data). The verification subsystem 118 may or may not be integrated with the augmented reality device 102. Typically, the verification subsystem 118 is a program code (e.g., computer software) that is executable by a computer processor. As will be appreciated by a person of ordinary skill in the art, the verification subsystem 118 may also be computer hardware (e.g., an integrated circuit).

The verification subsystem 118 is configured for receiving the virtual three-dimensional object 120 having a modified shape from the object renderer 106. In other words, after the user modifies the shape of the three-dimensional object 120 through the user's gesture(s), the object renderer 106 transmits the now-modified three-dimensional object 120 (e.g., a computer file storing data representing the three-dimensional object) to the verification subsystem 118. Typically, the user indicates that the desired modifications to the virtual three-dimensional object have been completed by providing a prompt (e.g., a vocal/aural prompt, a touchpad entry, a gesture such as a hand clap, etc.) for the object renderer 106 to transmit the modified virtual three-dimensional object to the verification subsystem 118.

The verification subsystem 118 is also configured for receiving the authentication object 128 from the authentication database 122. Typically, the verification subsystem 118 sends a request for the authentication object 128 to the authentication database 122. A database management system may be used to facilitate the request.

The verification subsystem 118 is also configured for comparing the virtual three-dimensional object having a modified shape 120 to the authentication object 128. The verification subsystem 118 is also configured for authenticating the user if the virtual three-dimensional object's modified shape matches the authentication object's shape. In this way, the user authentication system 100 according to the present invention only authenticates a user in the computer environment if the user is able to modify the shape of the virtual three-dimensional object 120 in such a way that the virtual three-dimensional object 120 is determined by the verification subsystem 118 to match the authentication object 128.

Figure 3:
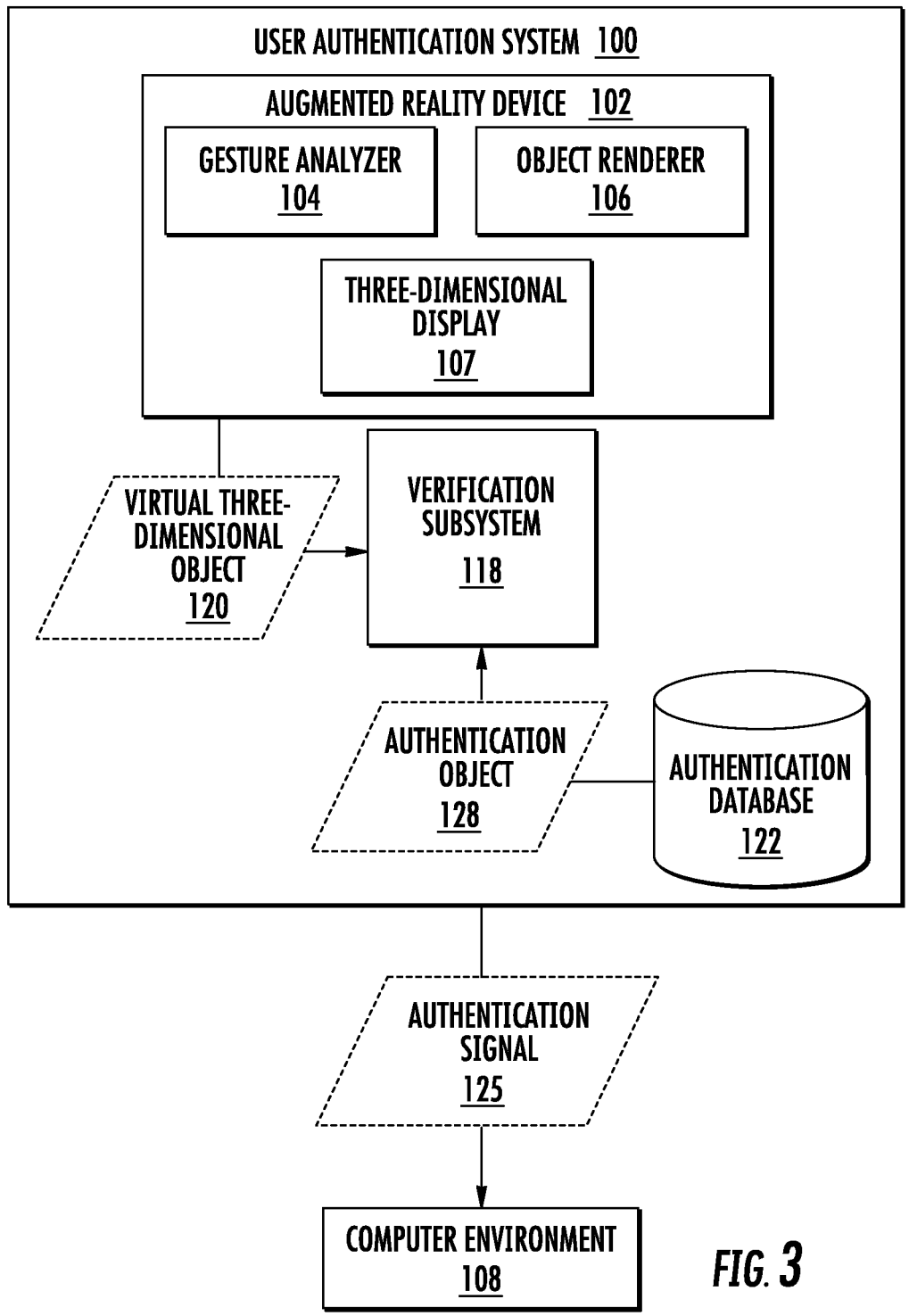
FIG. 3 is a block diagram of an exemplary user authentication system in communication with a computer environment.

Typically, the verification subsystem 118 authenticates the user by transmitting an authentication signal 125 to the computer environment. For example, and as shown in FIG. 3, when the verification system 118 determines that the virtual three-dimensional object 120, as modified by the user, matches the authentication object 128, the verification subsystem 118 may transmit an authentication signal 125 to the computer environment 108 indicating to the computer environment 108 that the user is authorized to have access to some or all of the computer environment (e.g., access to computer programs, stored computer files/data, etc.). For example, a user of a computer environment in the form of a smartphone having connectivity with an augmented reality device 10 may be required to modify the shape of a virtual three-dimensional object 120 into the shape of the authentication object 128 prior to be able to access the features of the smartphone.

The use of the term "match" is not necessarily intended to mean that the shape of the three-dimensional object 120 is identical in every way to the shape of the authentication object 128, although the verification subsystem 118 may be configured in that way. In some instances, it may be difficult for a user to precisely replicate the shape of the authentication object. Therefore, the verification subsystem 118 may be configured to determine that the shape of the virtual three-dimensional object 120 matches the shape of the authentication object 128 if the two shapes are substantially the same. In some embodiments, the two objects may be deemed to have substantially the same shape if their shapes match each other by a pre-determined percentage (e.g., greater than about 80 percent (e.g., greater than or equal to 90 percent)). In particular, in instances where the shape of the authentication object 128 is relatively complex, the verification subsystem 118 may deem that the shape of the virtual three-dimensional object 120, as modified by the user, is a match even if the shapes of the two objects are not identical. In instances where the shape of the authentication object 128 is relatively simple (e.g., a diamond shape), the verification subsystem 118 may be configured to deem that the shape of the three-dimensional object 120 matches the authentication object's shape only if the two shapes are identical (e.g., the positions (e.g., relative positions) of the corresponding three-dimensional vertices 136 are the same).

Figure 8:
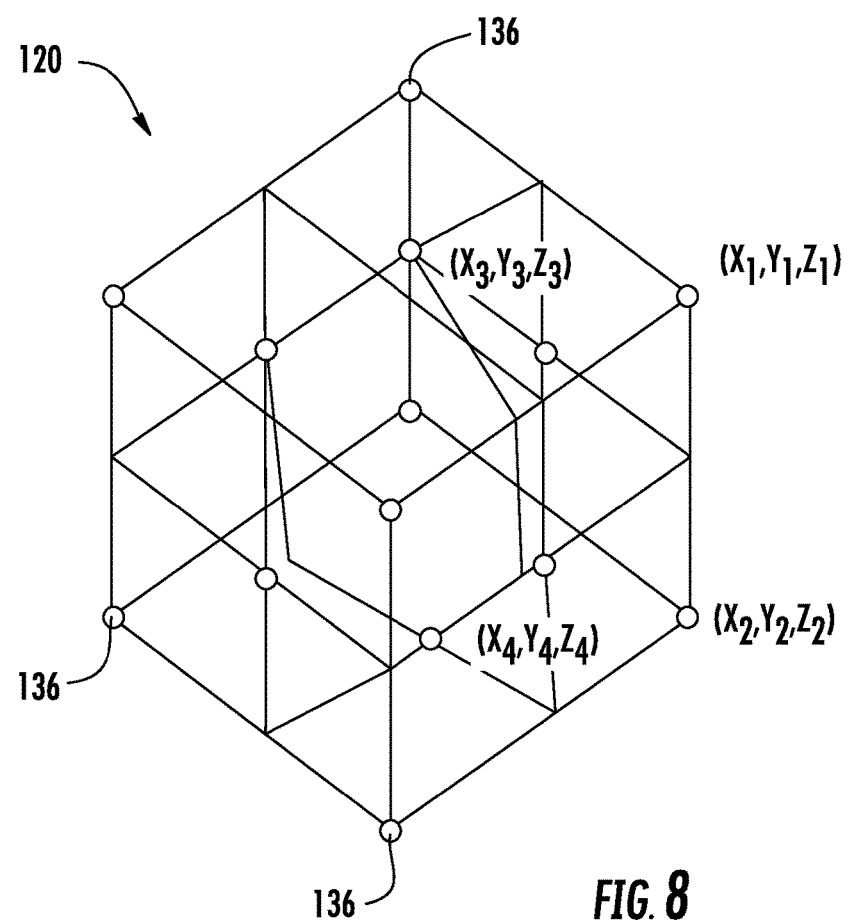
FIG. 8 is an exemplary virtual three-dimensional object according to the present disclosure.
Figure 9:
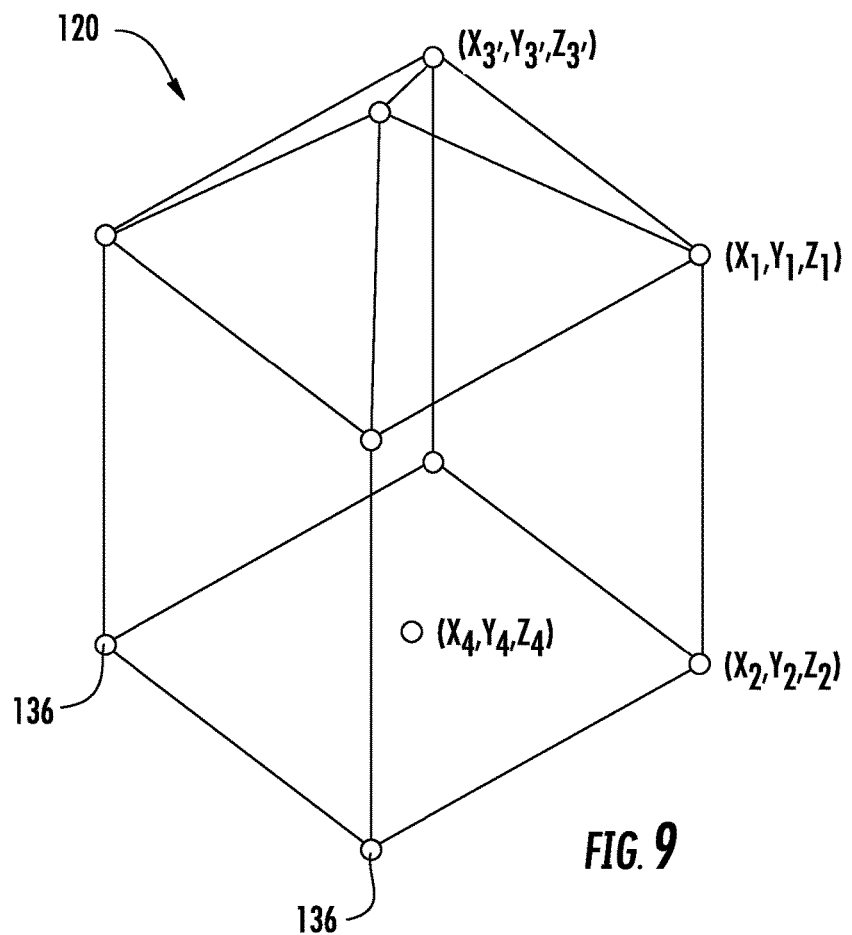
FIG. 9 is an exemplary virtual three-dimensional object according to the present disclosure after modification by a user's gesture.
Figure 10:
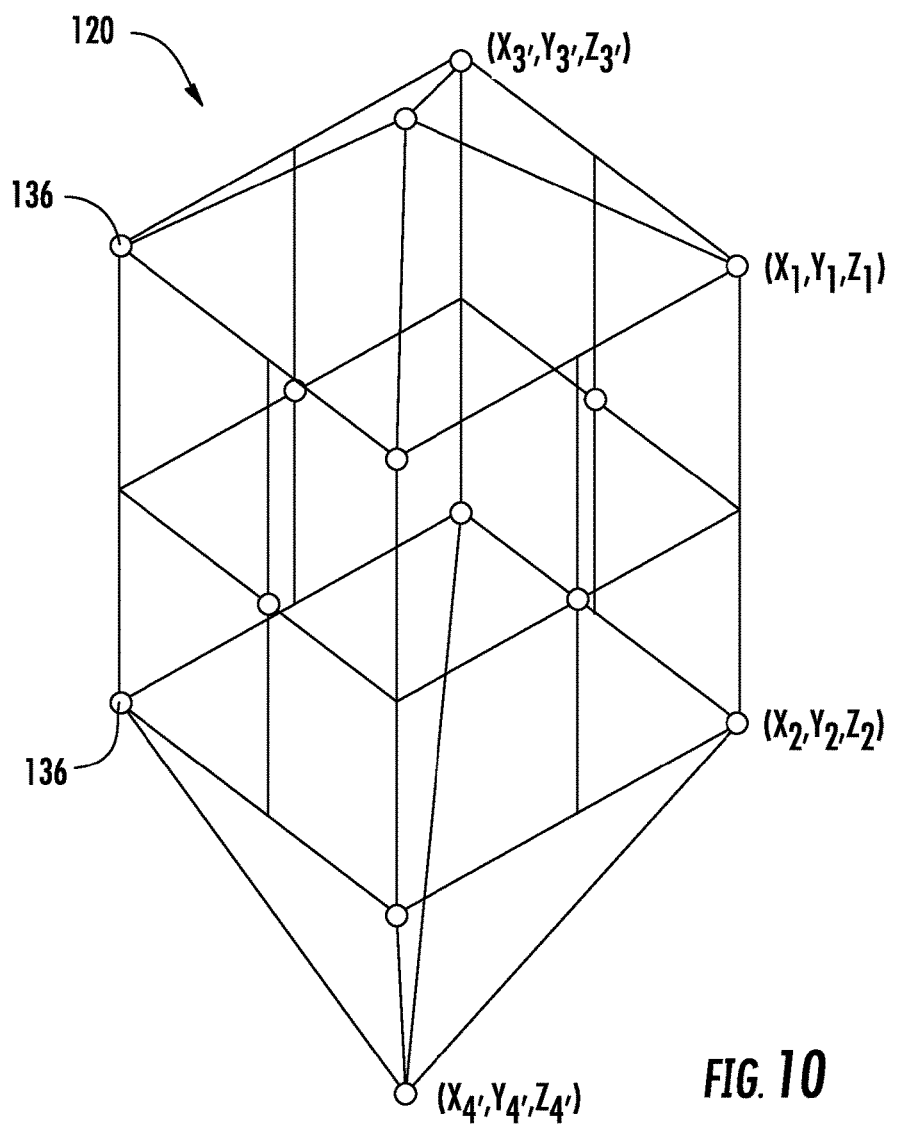
FIG. 10 is an exemplary virtual three-dimensional object according to the present disclosure after further modification by a user's gesture.

As shown in FIGS. 7-10, the shape of the virtual three-dimensional object and the authentication object are typically defined by a plurality of three-dimensional vertices 136. More specifically, the virtual three-dimensional object is rendered as a mesh of three-dimensional vertices, typically overlaid with a surface texture or shading as desired. Each three-dimensional vertex 136 is associated with a position (e.g., a position in three-dimensional space). In other words, the virtual three-dimensional object includes a plurality of three-dimensional vertices, each of which is associated with a position; and the authentication object includes a plurality of three-dimensional vertices, each of which is associated with a position. The position of each three-dimensional vertex 136 may be defined in a variety of ways. Typically, the position of each three-dimensional vertex is defined as a coordinate in a three-dimensional coordinate system (e.g., Cartesian coordinate system). For example, as shown in FIGS. 8-10, a coordinate system may use three coordinates (x, y, and z) to define the position of each three-dimensional vertex 136.

As will be appreciated by a person of ordinary skill in the art, a variety of techniques may be employed for comparing the shape of the (modified) virtual three-dimensional object 120 to the shape of the authentication object 128. Typically, the verification subsystem 118 determines the position of each three-dimensional vertex 136 associated with each object. Then the verification subsystem 118 compares the positions of the three-dimensional vertices 136 associated with the virtual three-dimensional object with the three-dimensional vertices 136 associated with the authentication object 128. Because the objects may be oriented differently (e.g., rotationally oriented) in three-dimensional space, instead of comparing absolute positions in three-dimensional space, the verification system 118 may use the relative position of each three-dimensional vertex 136 vis-à-vis the other vertices in the object. In this way, a user may be able to create a virtual three-dimensional object 120 that the verification subsystem 118 recognizes as having the same shape as the authentication object 128 even though the orientation of the two objects in three-dimensional space is not the same. Therefore, references herein to three-dimensional vertices having the same position may refer to the position vis-à-vis the augmented reality device 10 or relative to other vertices within the same object.

Typically, the authentication subsystem 118 employs a predetermined algorithm for comparing the virtual three-dimensional object 120 to the authentication object 128. Typically, the verification subsystem 118 encodes the position of each three-dimensional vertex into a passkey (e.g., a template). This passkey can then be compared to a previously-created reference passkey associated with the authentication object's three-dimensional vertices. This methodology mimics the concepts used for traditional alphanumeric passwords, except the passwords are now encoded passkeys created based upon the three-dimensional coordinates of the three-dimensional vertices of the virtual three-dimensional object/authentication object. Encoding of points and vertices into a reference template is known in the art in connection with biometric identification (authentication) methods. For example, iris images are scanned for unique feature points. These feature points are then encoded into a unique numeric reference template which uniquely identifies the iris. Future scans of the iris generate an authentication template which can be compared against the reference template for authentication. The encoding used to complete the templating of three-dimensional vertices herein is substantially similar to this known methodology.

As mentioned, the user may not be required to modify the shape of the virtual three-dimensional object to the exact shape of the authentication object. Instead, the verification subsystem 118 may only require that the two shapes be substantially the same prior to authenticating the user for the computer environment. As such, in certain embodiments, the verification subsystem 118 may be configured to determine that the virtual three-dimensional object's modified shape matches the authentication object's shape if, for each of a predetermined percentage of vertices of the authentication object, there is a corresponding vertex of the virtual three-dimensional object having the same position.

Figure 4:
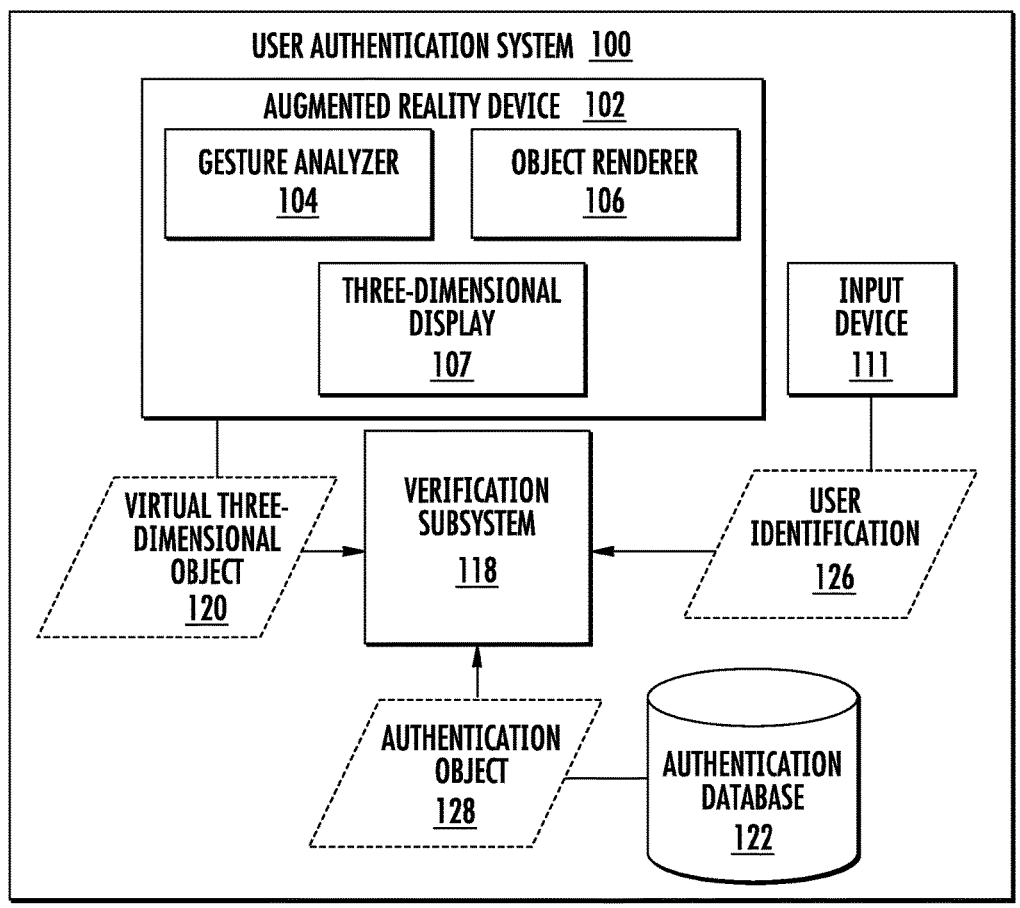
FIG. 4 is a block diagram of another alternative embodiment of an exemplary user authentication system according to the present disclosure.

In certain alternative embodiments, and as shown in FIG. 4, the user authentication system 100 according to the present disclosure includes an input device for receiving a user identification 126 from the user. A user identification 126 is information (e.g., data) that uniquely identifies the user and distinguishes the user from any other user or potential user of the computer environment. Typically, a user identification 126 (sometimes known as a user ID, login ID, username, etc.) is an alphanumeric identifier (e.g., string). In one embodiment, the input device 111 is a touchpad. In another embodiment, the input device is a physical keyboard (e.g., QWERTY keyboard) or a virtual keyboard. In another embodiment, the input device 111 is a microphone for allowing the user to speak the user identification, which may be recognized and converted into an alphanumeric identifier, or which may just be a sound or sequence of sounds recognized by the system 100 as being a user identification 126. The input device 111 may be any other type of device which may receive a user identification (e.g., a touchpad, a virtual keyboard, a 2D pop-up touch keyboard, keypad on a display screen, a camera configured for facial recognition, gesture recognition, optical character recognition, etc.).

Typically, the authentication object 128 is associated with the user identification 126. For example, the authentication database 122 typically stores record of the user identification/authentication object tuple. More typically, the authentication database 122 contains a plurality of records, with each record containing a user identification 126 and an associated authentication object 128. When the user inputs a user identification 126 via the input device 111, the system 100 determines from the authentication database 122 what the associated authentication object 128 is for that user. Typically, the authentication object 128 is pre-defined by the user. For example, when the user creates a user account, the user creates an authentication object 128 for association with the user's unique user identification 126. Alternatively, the user may select an authentication object 128 from a pre-defined assortment of objects. In this way, the system 100 allows for each user to have a different authentication object 128, thereby increasing the security of the authentication process.

In one embodiment, the shape of the virtual-three dimensional object 120 initially rendered by the object renderer 106 depends upon the user identification 126 submitted by the user via the input device 111. In other words, the shape of the virtual three-dimensional object 120 that is initially presented to one user may be a different shape than is initially presented to another user. In some embodiments, the initial shape of the virtual three-dimensional object 120 is different for each user. In other embodiments, the initial shape of the virtual three-dimensional object 120 is the same for each user. By allowing the initial shape of the virtual three-dimensional object 120 to differ among users, the system accounts for varying complexities that may exist between the shapes of different authentication objects 128. For authentication objects having a complex shape, the initial shape of the virtual three-dimensional object may need to be relatively complex, thereby avoiding the need for the user to spend too much time modifying the shape of the virtual three-dimensional object to match the authentication shape. In other instances, the shape of the authentication shape may be simple, and therefore the initial shape of the virtual three-dimensional object may only need to be a simple shape (e.g., a cube).

Figure 6:
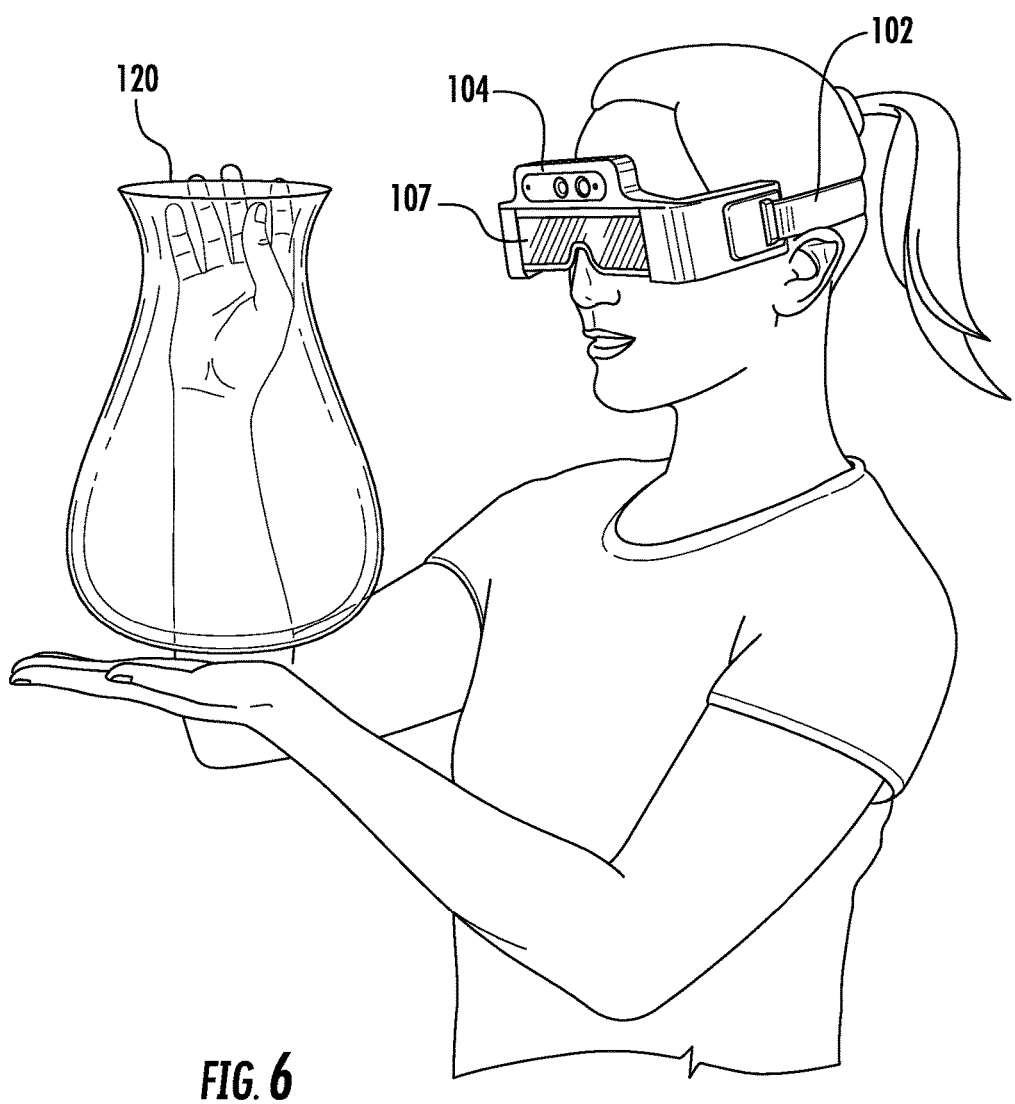
FIG. 6 is an exemplary user virtually manipulating a virtual three-dimensional object rendered by the system of the present disclosure.
Figure 7:
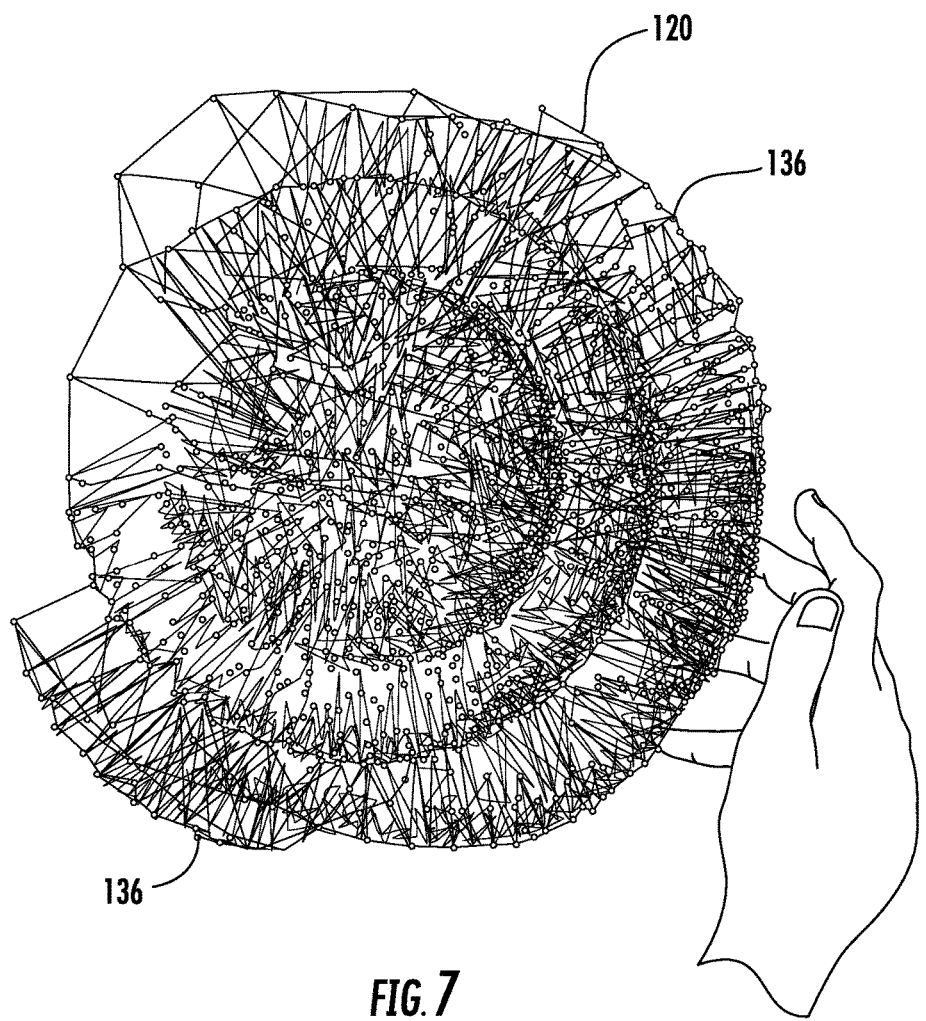
FIG. 7 is an exemplary virtual three-dimensional object according to the present disclosure.

FIG. 6 depicts an exemplary user of an exemplary system 100 according to the present disclosure. The user is wearing an augmented reality device 102 on her head in the same manner as one would wear eyeglasses. The augmented reality device 102 renders an image of a virtual three-dimensional object 120 for viewing by the user. In this case, the virtual three-dimensional object is a vase. To gain authentication into the computer environment, the user uses hand gestures to modify the shape of the virtual three-dimensional object into a shape that the verification subsystem 118 will deem to be a match with the shape of the authentication object 128.

FIG. 8 depicts how a virtual three-dimensional object (or authentication object) may be virtually constructed using a plurality of three-dimensional vertices 136. In this instance, a plurality of three-dimensional vertices 136 are spaced apart in positions, thereby creating the virtual skeleton of a cube. The three-dimensional vertices define the corner points of the cube as well as the center points of each face. As shown in FIG. 9, the shape of the virtual three-dimensional object shown in FIG. 8 can be modified by a user's gestures. Each time the user applies a new gesture to the virtual three-dimensional object 120, the object renderer 106 redraws the object to reflect the newly-modified shape so that the user has visual feedback of the user's movements and their effect upon the shape of the object. For example, if the user places her hand above the object and makes a pulling gesture in an upward direction, the object renderer 106 recalculates the position of the three-dimensional vertex having an associated position of $X_3$, $Y_3$, $Z_3$. The user's gesture therefore results in modifying the shape of the virtual three-dimensional object from a cube to a cube having a square pyramidal top. As shown in FIG. 10, the user may employ a similar pulling motion to the bottom of the object to generate a modified virtual three-dimensional object having two opposing pyramidal sides (e.g., a diamond-shaped object). A person of ordinary skill in the art will appreciate that the examples in FIGS. 8 through 10 are very basic, and that the present system 100 is capable of employing much more complex three-dimensional objects, thereby providing a much higher level of security.

In another aspect, the present disclosure embraces a method of authenticating a user in a computer environment. A virtual three-dimensional object is rendered for display to the user via an augmented reality device's object renderer. The user's gesture is recognized using the augmented reality device's gesture analyzer. The shape of the virtual three-dimensional object is modified based upon the recognized gesture. The modified shape of the virtual three-dimensional object is compared via a verification subsystem to an authentication object. The user is authenticated (e.g., logged into the computer environment) if the modified shape of the virtual three-dimensional object matches the authentication object.

To supplement the present disclosure, this application incorporates entirely by reference the following patents, patent application publications, and patent applications:
U.S. Pat. No. 6,832,725; U.S. Pat. No. 7,128,266;
U.S. Pat. No. 7,159,783; U.S. Pat. No. 7,413,127;
U.S. Pat. No. 7,726,575; U.S. Pat. No. 8,294,969;
U.S. Pat. No. 8,317,105; U.S. Pat. No. 8,322,622;
U.S. Pat. No. 8,366,005; U.S. Pat. No. 8,371,507;
U.S. Pat. No. 8,376,233; U.S. Pat. No. 8,381,979;
U.S. Pat. No. 8,390,909; U.S. Pat. No. 8,408,464;
U.S. Pat. No. 8,408,468; U.S. Pat. No. 8,408,469;
U.S. Pat. No. 8,424,768; U.S. Pat. No. 8,448,863;
U.S. Pat. No. 8,457,013; U.S. Pat. No. 8,459,557;
U.S. Pat. No. 8,469,272; U.S. Pat. No. 8,474,712;
U.S. Pat. No. 8,479,992; U.S. Pat. No. 8,490,877;
U.S. Pat. No. 8,517,271; U.S. Pat. No. 8,523,076;
U.S. Pat. No. 8,528,818; U.S. Pat. No. 8,544,737;
U.S. Pat. No. 8,548,242; U.S. Pat. No. 8,548,420;
U.S. Pat. No. 8,550,335; U.S. Pat. No. 8,550,354;
U.S. Pat. No. 8,550,357; U.S. Pat. No. 8,556,174;
U.S. Pat. No. 8,556,176; U.S. Pat. No. 8,556,177;
U.S. Pat. No. 8,559,767; U.S. Pat. No. 8,599,957;
U.S. Pat. No. 8,561,895; U.S. Pat. No. 8,561,903;
U.S. Pat. No. 8,561,905; U.S. Pat. No. 8,565,107;
U.S. Pat. No. 8,571,307; U.S. Pat. No. 8,579,200;
U.S. Pat. No. 8,583,924; U.S. Pat. No. 8,584,945;
U.S. Pat. No. 8,587,595; U.S. Pat. No. 8,587,697;
U.S. Pat. No. 8,588,869; U.S. Pat. No. 8,590,789;
U.S. Pat. No. 8,596,539; U.S. Pat. No. 8,596,542;
U.S. Pat. No. 8,596,543; U.S. Pat. No. 8,599,271;
U.S. Pat. No. 8,599,957; U.S. Pat. No. 8,600,158;
U.S. Pat. No. 8,600,167; U.S. Pat. No. 8,602,309;
U.S. Pat. No. 8,608,053; U.S. Pat. No. 8,608,071;
U.S. Pat. No. 8,611,309; U.S. Pat. No. 8,615,487;
U.S. Pat. No. 8,616,454; U.S. Pat. No. 8,621,123;
U.S. Pat. No. 8,622,303; U.S. Pat. No. 8,628,013;
U.S. Pat. No. 8,628,015; U.S. Pat. No. 8,628,016;
U.S. Pat. No. 8,629,926; U.S. Pat. No. 8,630,491;
U.S. Pat. No. 8,635,309; U.S. Pat. No. 8,636,200;
U.S. Pat. No. 8,636,212; U.S. Pat. No. 8,636,215;
U.S. Pat. No. 8,636,224; U.S. Pat. No. 8,638,806;
U.S. Pat. No. 8,640,958; U.S. Pat. No. 8,640,960;
U.S. Pat. No. 8,643,717; U.S. Pat. No. 8,646,692;
U.S. Pat. No. 8,646,694; U.S. Pat. No. 8,657,200;
U.S. Pat. No. 8,659,397; U.S. Pat. No. 8,668,149;
U.S. Pat. No. 8,678,285; U.S. Pat. No. 8,678,286;
U.S. Pat. No. 8,682,077; U.S. Pat. No. 8,687,282;
U.S. Pat. No. 8,692,927; U.S. Pat. No. 8,695,880;
U.S. Pat. No. 8,698,949; U.S. Pat. No. 8,717,494;
U.S. Pat. No. 8,717,494; U.S. Pat. No. 8,720,783;
U.S. Pat. No. 8,723,804; U.S. Pat. No. 8,723,904;
U.S. Pat. No. 8,727,223; U.S. Pat. No. D702,237;
U.S. Pat. No. 8,740,082; U.S. Pat. No. 8,740,085;
U.S. Pat. No. 8,746,563; U.S. Pat. No. 8,750,445;
U.S. Pat. No. 8,752,766; U.S. Pat. No. 8,756,059;
U.S. Pat. No. 8,757,495; U.S. Pat. No. 8,760,563;
U.S. Pat. No. 8,763,909; U.S. Pat. No. 8,777,108;
U.S. Pat. No. 8,777,109; U.S. Pat. No. 8,779,898;
U.S. Pat. No. 8,781,520; U.S. Pat. No. 8,783,573;
U.S. Pat. No. 8,789,757; U.S. Pat. No. 8,789,758;
U.S. Pat. No. 8,789,759; U.S. Pat. No. 8,794,520;
U.S. Pat. No. 8,794,522; U.S. Pat. No. 8,794,525;
U.S. Pat. No. 8,794,526; U.S. Pat. No. 8,798,367;
U.S. Pat. No. 8,807,431; U.S. Pat. No. 8,807,432;
U.S. Pat. No. 8,820,630; U.S. Pat. No. 8,822,848;
U.S. Pat. No. 8,824,692; U.S. Pat. No. 8,824,696;
U.S. Pat. No. 8,842,849; U.S. Pat. No. 8,844,822;
U.S. Pat. No. 8,844,823; U.S. Pat. No. 8,849,019;
U.S. Pat. No. 8,851,383; U.S. Pat. No. 8,854,633;
U.S. Pat. No. 8,866,963; U.S. Pat. No. 8,868,421;
U.S. Pat. No. 8,868,519; U.S. Pat. No. 8,868,802;
U.S. Pat. No. 8,868,803; U.S. Pat. No. 8,870,074;
U.S. Pat. No. 8,879,639; U.S. Pat. No. 8,880,426;
U.S. Pat. No. 8,881,983; U.S. Pat. No. 8,881,987;
U.S. Pat. No. 8,903,172; U.S. Pat. No. 8,908,995;
U.S. Pat. No. 8,910,870; U.S. Pat. No. 8,910,875;
U.S. Pat. No. 8,914,290; U.S. Pat. No. 8,914,788;
U.S. Pat. No. 8,915,439; U.S. Pat. No. 8,915,444;
U.S. Pat. No. 8,916,789; U.S. Pat. No. 8,918,250;
U.S. Pat. No. 8,918,564; U.S. Pat. No. 8,925,818;
U.S. Pat. No. 8,939,374; U.S. Pat. No. 8,942,480;
U.S. Pat. No. 8,944,313; U.S. Pat. No. 8,944,327;
U.S. Pat. No. 8,944,332; U.S. Pat. No. 8,950,678;
U.S. Pat. No. 8,967,468; U.S. Pat. No. 8,971,346;
U.S. Pat. No. 8,976,030; U.S. Pat. No. 8,976,368;
U.S. Pat. No. 8,978,981; U.S. Pat. No. 8,978,983;
U.S. Pat. No. 8,978,984; U.S. Pat. No. 8,985,456;
U.S. Pat. No. 8,985,457; U.S. Pat. No. 8,985,459;
U.S. Pat. No. 8,985,461; U.S. Pat. No. 8,988,578;
U.S. Pat. No. 8,988,590; U.S. Pat. No. 8,991,704;
U.S. Pat. No. 8,996,194; U.S. Pat. No. 8,996,384;
U.S. Pat. No. 9,002,641; U.S. Pat. No. 9,007,368;
U.S. Pat. No. 9,010,641; U.S. Pat. No. 9,015,513;
U.S. Pat. No. 9,016,576; U.S. Pat. No. 9,022,288;
U.S. Pat. No. 9,030,964; U.S. Pat. No. 9,033,240;
U.S. Pat. No. 9,033,242; U.S. Pat. No. 9,036,054;
U.S. Pat. No. 9,037,344; U.S. Pat. No. 9,038,911;
U.S. Pat. No. 9,038,915; U.S. Pat. No. 9,047,098;
U.S. Pat. No. 9,047,359; U.S. Pat. No. 9,047,420;
U.S. Pat. No. 9,047,525; U.S. Pat. No. 9,047,531;
U.S. Pat. No. 9,053,055; U.S. Pat. No. 9,053,378;
U.S. Pat. No. 9,053,380; U.S. Pat. No. 9,058,526;
U.S. Pat. No. 9,064,165; U.S. Pat. No. 9,064,167;
U.S. Pat. No. 9,064,168; U.S. Pat. No. 9,064,254;
U.S. Pat. No. 9,066,032; U.S. Pat. No. 9,070,032;
U.S. Design Pat. No. D716,285;
U.S. Design Pat. No. D723,560;
U.S. Design Pat. No. D730,357;
U.S. Design Pat. No. D730,901;
U.S. Design Pat. No. D730,902;
U.S. Design Pat. No. D733,112;
U.S. Design Pat. No. D734,339;
International Publication No. 2013/163789;

International Publication No. 2013/173985;
International Publication No. 2014/019130;
International Publication No. 2014/110495;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2010/0265880;
U.S. Patent Application Publication No. 2011/0202554;
U.S. Patent Application Publication No. 2012/0111946;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0287258;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0313325;
U.S. Patent Application Publication No. 2013/0342717;
U.S. Patent Application Publication No. 2014/0001267;
U.S. Patent Application Publication No. 2014/0008439;
U.S. Patent Application Publication No. 2014/0025584;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0042814;
U.S. Patent Application Publication No. 2014/0049120;
U.S. Patent Application Publication No. 2014/0049635;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0076974;
U.S. Patent Application Publication No. 2014/0078341;
U.S. Patent Application Publication No. 2014/0078345;
U.S. Patent Application Publication No. 2014/0097249;
U.S. Patent Application Publication No. 2014/0098792;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0104451;
U.S. Patent Application Publication No. 2014/0106594;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0110485;
U.S. Patent Application Publication No. 2014/0114530;
U.S. Patent Application Publication No. 2014/0124577;
U.S. Patent Application Publication No. 2014/0124579;
U.S. Patent Application Publication No. 2014/0125842;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131438;
U.S. Patent Application Publication No. 2014/0131441;
U.S. Patent Application Publication No. 2014/0131443;
U.S. Patent Application Publication No. 2014/0131444;
U.S. Patent Application Publication No. 2014/0131445;
U.S. Patent Application Publication No. 2014/0131448;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0151453;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0166755;
U.S. Patent Application Publication No. 2014/0166759;
U.S. Patent Application Publication No. 2014/0168787;
U.S. Patent Application Publication No. 2014/0175165;
U.S. Patent Application Publication No. 2014/0175172;
U.S. Patent Application Publication No. 2014/0191644;
U.S. Patent Application Publication No. 2014/0191913;
U.S. Patent Application Publication No. 2014/0197238;
U.S. Patent Application Publication No. 2014/0197239;
U.S. Patent Application Publication No. 2014/0197304;
U.S. Patent Application Publication No. 2014/0214631;
U.S. Patent Application Publication No. 2014/0217166;
U.S. Patent Application Publication No. 2014/0217180;
U.S. Patent Application Publication No. 2014/0231500;
U.S. Patent Application Publication No. 2014/0232930;
U.S. Patent Application Publication No. 2014/0247315;
U.S. Patent Application Publication No. 2014/0263493;
U.S. Patent Application Publication No. 2014/0263645;
U.S. Patent Application Publication No. 2014/0267609;
U.S. Patent Application Publication No. 2014/0270196;
U.S. Patent Application Publication No. 2014/0270229;
U.S. Patent Application Publication No. 2014/0278387;
U.S. Patent Application Publication No. 2014/0278391;
U.S. Patent Application Publication No. 2014/0282210;
U.S. Patent Application Publication No. 2014/0284384;
U.S. Patent Application Publication No. 2014/0288933;
U.S. Patent Application Publication No. 2014/0297058;
U.S. Patent Application Publication No. 2014/0299665;
U.S. Patent Application Publication No. 2014/0312121;
U.S. Patent Application Publication No. 2014/0319220;
U.S. Patent Application Publication No. 2014/0319221;
U.S. Patent Application Publication No. 2014/0326787;
U.S. Patent Application Publication No. 2014/0332590;
U.S. Patent Application Publication No. 2014/0344943;
U.S. Patent Application Publication No. 2014/0346233;
U.S. Patent Application Publication No. 2014/0351317;
U.S. Patent Application Publication No. 2014/0353373;
U.S. Patent Application Publication No. 2014/0361073;
U.S. Patent Application Publication No. 2014/0361082;
U.S. Patent Application Publication No. 2014/0362184;
U.S. Patent Application Publication No. 2014/0363015;
U.S. Patent Application Publication No. 2014/0369511;
U.S. Patent Application Publication No. 2014/0374483;
U.S. Patent Application Publication No. 2014/0374485;

U.S. Patent Application Publication No. 2015/0001301;
U.S. Patent Application Publication No. 2015/0001304;
U.S. Patent Application Publication No. 2015/0003673;
U.S. Patent Application Publication No. 2015/0009338;
U.S. Patent Application Publication No. 2015/0009610;
U.S. Patent Application Publication No. 2015/0014416;
U.S. Patent Application Publication No. 2015/0021397;
U.S. Patent Application Publication No. 2015/0028102;
U.S. Patent Application Publication No. 2015/0028103;
U.S. Patent Application Publication No. 2015/0028104;
U.S. Patent Application Publication No. 2015/0029002;
U.S. Patent Application Publication No. 2015/0032709;
U.S. Patent Application Publication No. 2015/0039309;
U.S. Patent Application Publication No. 2015/0039878;
U.S. Patent Application Publication No. 2015/0040378;
U.S. Patent Application Publication No. 2015/0048168;
U.S. Patent Application Publication No. 2015/0049347;
U.S. Patent Application Publication No. 2015/0051992;
U.S. Patent Application Publication No. 2015/0053766;
U.S. Patent Application Publication No. 2015/0053768;
U.S. Patent Application Publication No. 2015/0053769;
U.S. Patent Application Publication No. 2015/0060544;
U.S. Patent Application Publication No. 2015/0062366;
U.S. Patent Application Publication No. 2015/0063215;
U.S. Patent Application Publication No. 2015/0063676;
U.S. Patent Application Publication No. 2015/0069130;
U.S. Patent Application Publication No. 2015/0071819;
U.S. Patent Application Publication No. 2015/0083800;
U.S. Patent Application Publication No. 2015/0086114;
U.S. Patent Application Publication No. 2015/0088522;
U.S. Patent Application Publication No. 2015/0096872;
U.S. Patent Application Publication No. 2015/0099557;
U.S. Patent Application Publication No. 2015/0100196;
U.S. Patent Application Publication No. 2015/0102109;
U.S. Patent Application Publication No. 2015/0115035;
U.S. Patent Application Publication No. 2015/0127791;
U.S. Patent Application Publication No. 2015/0128116;
U.S. Patent Application Publication No. 2015/0129659;
U.S. Patent Application Publication No. 2015/0133047;
U.S. Patent Application Publication No. 2015/0134470;
U.S. Patent Application Publication No. 2015/0136851;
U.S. Patent Application Publication No. 2015/0136854;
U.S. Patent Application Publication No. 2015/0142492;
U.S. Patent Application Publication No. 2015/0144692;
U.S. Patent Application Publication No. 2015/0144698;
U.S. Patent Application Publication No. 2015/0144701;
U.S. Patent Application Publication No. 2015/0149946;
U.S. Patent Application Publication No. 2015/0161429;
U.S. Patent Application Publication No. 2015/0169925;
U.S. Patent Application Publication No. 2015/0169929;
U.S. Patent Application Publication No. 2015/0178523;
U.S. Patent Application Publication No. 2015/0178534;
U.S. Patent Application Publication No. 2015/0178535;
U.S. Patent Application Publication No. 2015/0178536;
U.S. Patent Application Publication No. 2015/0178537;
U.S. Patent Application Publication No. 2015/0181093;
U.S. Patent Application Publication No. 2015/0181109;
U.S. patent application Ser. No. 13/367,978 for a Laser Scanning Module Employing an Elastomeric U-Hinge Based Laser Scanning Assembly, filed Feb. 7, 2012 (Feng et al.);
U.S. patent application Ser. No. 29/458,405 for an Electronic Device, filed Jun. 19, 2013 (Fitch et al.);
U.S. patent application Ser. No. 29/459,620 for an Electronic Device Enclosure, filed Jul. 2, 2013 (London et al.);
U.S. patent application Ser. No. 29/468,118 for an Electronic Device Case, filed Sep. 26, 2013 (Oberpriller et al.);

U.S. patent application Ser. No. 14/150,393 for Indicia-reader Having Unitary Construction Scanner, filed Jan. 8, 2014 (Colavito et al.);
U.S. patent application Ser. No. 14/200,405 for Indicia Reader for Size-Limited Applications filed Mar. 7, 2014 (Feng et al.);
U.S. patent application Ser. No. 14/231,898 for Hand-Mounted Indicia-Reading Device with Finger Motion Triggering filed Apr. 1, 2014 (Van Horn et al.);
U.S. patent application Ser. No. 29/486,759 for an Imaging Terminal, filed Apr. 2, 2014 (Oberpriller et al.);
U.S. patent application Ser. No. 14/257,364 for Docking System and Method Using Near Field Communication filed Apr. 21, 2014 (Showering);
U.S. patent application Ser. No. 14/264,173 for Autofocus Lens System for Indicia Readers filed Apr. 29, 2014 (Ackley et al.);
U.S. patent application Ser. No. 14/277,337 for MULTI-PURPOSE OPTICAL READER, filed May 14, 2014 (Jovanovski et al.);
U.S. patent application Ser. No. 14/283,282 for TERMINAL HAVING ILLUMINATION AND FOCUS CONTROL filed May 21, 2014 (Liu et al.);
U.S. patent application Ser. No. 14/327,827 for a MOBILE-PHONE ADAPTER FOR ELECTRONIC TRANSACTIONS, filed Jul. 10, 2014 (Hejl);
U.S. patent application Ser. No. 14/334,934 for a SYSTEM AND METHOD FOR INDICIA VERIFICATION, filed Jul. 18, 2014 (Hejl);
U.S. patent application Ser. No. 14/339,708 for LASER SCANNING CODE SYMBOL READING SYSTEM, filed Jul. 24, 2014 (Xian et al.);
U.S. patent application Ser. No. 14/340,627 for an AXIALLY REINFORCED FLEXIBLE SCAN ELEMENT, filed Jul. 25, 2014 (Rueblinger et al.);
U.S. patent application Ser. No. 14/446,391 for MULTIFUNCTION POINT OF SALE APPARATUS WITH OPTICAL SIGNATURE CAPTURE filed Jul. 30, 2014 (Good et al.);
U.S. patent application Ser. No. 14/452,697 for INTERACTIVE INDICIA READER, filed Aug. 6, 2014 (Todeschini);
U.S. patent application Ser. No. 14/453,019 for DIMENSIONING SYSTEM WITH GUIDED ALIGNMENT, filed Aug. 6, 2014 (Li et al.);
U.S. patent application Ser. No. 14/462,801 for MOBILE COMPUTING DEVICE WITH DATA COGNITION SOFTWARE, filed on Aug. 19, 2014 (Todeschini et al.);
U.S. patent application Ser. No. 14/483,056 for VARIABLE DEPTH OF FIELD BARCODE SCANNER filed Sep. 10, 2014 (McCloskey et al.);
U.S. patent application Ser. No. 14/513,808 for IDENTIFYING INVENTORY ITEMS IN A STORAGE FACILITY filed Oct. 14, 2014 (Singel et al.);
U.S. patent application Ser. No. 14/519,195 for HAND-HELD DIMENSIONING SYSTEM WITH FEEDBACK filed Oct. 21, 2014 (Laffargue et al.);
U.S. patent application Ser. No. 14/519,179 for DIMENSIONING SYSTEM WITH MULTIPATH INTERFERENCE MITIGATION filed Oct. 21, 2014 (Thuries et al.);
U.S. patent application Ser. No. 14/519,211 for SYSTEM AND METHOD FOR DIMENSIONING filed Oct. 21, 2014 (Ackley et al.);
U.S. patent application Ser. No. 14/519,233 for HAND-HELD DIMENSIONER WITH DATA-QUALITY INDICATION filed Oct. 21, 2014 (Laffargue et al.);

U.S. patent application Ser. No. 14/519,249 for HAND-HELD DIMENSIONING SYSTEM WITH MEASUREMENT-CONFORMANCE FEEDBACK filed Oct. 21, 2014 (Ackley et al.);

U.S. patent application Ser. No. 14/527,191 for METHOD AND SYSTEM FOR RECOGNIZING SPEECH USING WILDCARDS IN AN EXPECTED RESPONSE filed Oct. 29, 2014 (Braho et al.);

U.S. patent application Ser. No. 14/529,563 for ADAPTABLE INTERFACE FOR A MOBILE COMPUTING DEVICE filed Oct. 31, 2014 (Schoon et al.);

U.S. patent application Ser. No. 14/529,857 for BARCODE READER WITH SECURITY FEATURES filed Oct. 31, 2014 (Todeschini et al.);

U.S. patent application Ser. No. 14/398,542 for PORTABLE ELECTRONIC DEVICES HAVING A SEPARATE LOCATION TRIGGER UNIT FOR USE IN CONTROLLING AN APPLICATION UNIT filed Nov. 3, 2014 (Bian et al.);

U.S. patent application Ser. No. 14/531,154 for DIRECTING AN INSPECTOR THROUGH AN INSPECTION filed Nov. 3, 2014 (Miller et al.);

U.S. patent application Ser. No. 14/533,319 for BARCODE SCANNING SYSTEM USING WEARABLE DEVICE WITH EMBEDDED CAMERA filed Nov. 5, 2014 (Todeschini);

U.S. patent application Ser. No. 14/535,764 for CONCATENATED EXPECTED RESPONSES FOR SPEECH RECOGNITION filed Nov. 7, 2014 (Braho et al.);

U.S. patent application Ser. No. 14/568,305 for AUTO-CONTRAST VIEWFINDER FOR AN INDICIA READER filed Dec. 12, 2014 (Todeschini);

U.S. patent application Ser. No. 14/573,022 for DYNAMIC DIAGNOSTIC INDICATOR GENERATION filed Dec. 17, 2014 (Goldsmith);

U.S. patent application Ser. No. 14/578,627 for SAFETY SYSTEM AND METHOD filed Dec. 22, 2014 (Ackley et al.);

U.S. patent application Ser. No. 14/580,262 for MEDIA GATE FOR THERMAL TRANSFER PRINTERS filed Dec. 23, 2014 (Bowles);

U.S. patent application Ser. No. 14/590,024 for SHELVING AND PACKAGE LOCATING SYSTEMS FOR DELIVERY VEHICLES filed Jan. 6, 2015 (Payne);

U.S. patent application Ser. No. 14/596,757 for SYSTEM AND METHOD FOR DETECTING BARCODE PRINTING ERRORS filed Jan. 14, 2015 (Ackley);

U.S. patent application Ser. No. 14/416,147 for OPTICAL READING APPARATUS HAVING VARIABLE SETTINGS filed Jan. 21, 2015 (Chen et al.);

U.S. patent application Ser. No. 14/614,706 for DEVICE FOR SUPPORTING AN ELECTRONIC TOOL ON A USER'S HAND filed Feb. 5, 2015 (Oberpriller et al.);

U.S. patent application Ser. No. 14/614,796 for CARGO APPORTIONMENT TECHNIQUES filed Feb. 5, 2015 (Morton et al.);

U.S. patent application Ser. No. 29/516,892 for TABLE COMPUTER filed Feb. 6, 2015 (Bidwell et al.);

U.S. patent application Ser. No. 14/619,093 for METHODS FOR TRAINING A SPEECH RECOGNITION SYSTEM filed Feb. 11, 2015 (Pecorari);

U.S. patent application Ser. No. 14/628,708 for DEVICE, SYSTEM, AND METHOD FOR DETERMINING THE STATUS OF CHECKOUT LANES filed Feb. 23, 2015 (Todeschini);

U.S. patent application Ser. No. 14/630,841 for TERMINAL INCLUDING IMAGING ASSEMBLY filed Feb. 25, 2015 (Gomez et al.);

U.S. patent application Ser. No. 14/635,346 for SYSTEM AND METHOD FOR RELIABLE STORE-AND-FORWARD DATA HANDLING BY ENCODED INFORMATION READING TERMINALS filed Mar. 2, 2015 (Sevier);

U.S. patent application Ser. No. 29/519,017 for SCANNER filed Mar. 2, 2015 (Zhou et al.);

U.S. patent application Ser. No. 14/405,278 for DESIGN PATTERN FOR SECURE STORE filed Mar. 9, 2015 (Zhu et al.);

U.S. patent application Ser. No. 14/660,970 for DECODABLE INDICIA READING TERMINAL WITH COMBINED ILLUMINATION filed Mar. 18, 2015 (Kearney et al.);

U.S. patent application Ser. No. 14/661,013 for REPROGRAMMING SYSTEM AND METHOD FOR DEVICES INCLUDING PROGRAMMING SYMBOL filed Mar. 18, 2015 (Soule et al.);

U.S. patent application Ser. No. 14/662,922 for MULTIFUNCTION POINT OF SALE SYSTEM filed Mar. 19, 2015 (Van Horn et al.);

U.S. patent application Ser. No. 14/663,638 for VEHICLE MOUNT COMPUTER WITH CONFIGURABLE IGNITION SWITCH BEHAVIOR filed Mar. 20, 2015 (Davis et al.);

U.S. patent application Ser. No. 14/664,063 for METHOD AND APPLICATION FOR SCANNING A BARCODE WITH A SMART DEVICE WHILE CONTINUOUSLY RUNNING AND DISPLAYING AN APPLICATION ON THE SMART DEVICE DISPLAY filed Mar. 20, 2015 (Todeschini);

U.S. patent application Ser. No. 14/669,280 for TRANSFORMING COMPONENTS OF A WEB PAGE TO VOICE PROMPTS filed Mar. 26, 2015 (Funyak et al.);

U.S. patent application Ser. No. 14/674,329 for AIMER FOR BARCODE SCANNING filed Mar. 31, 2015 (Bidwell);

U.S. patent application Ser. No. 14/676,109 for INDICIA READER filed Apr. 1, 2015 (Huck);

U.S. patent application Ser. No. 14/676,327 for DEVICE MANAGEMENT PROXY FOR SECURE DEVICES filed Apr. 1, 2015 (Yeakley et al.);

U.S. patent application Ser. No. 14/676,898 for NAVIGATION SYSTEM CONFIGURED TO INTEGRATE MOTION SENSING DEVICE INPUTS filed Apr. 2, 2015 (Showering);

U.S. patent application Ser. No. 14/679,275 for DIMENSIONING SYSTEM CALIBRATION SYSTEMS AND METHODS filed Apr. 6, 2015 (Laffargue et al.);

U.S. patent application Ser. No. 29/523,098 for HANDLE FOR A TABLET COMPUTER filed Apr. 7, 2015 (Bidwell et al.);

U.S. patent application Ser. No. 14/682,615 for SYSTEM AND METHOD FOR POWER MANAGEMENT OF MOBILE DEVICES filed Apr. 9, 2015 (Murawski et al.);

U.S. patent application Ser. No. 14/686,822 for MULTIPLE PLATFORM SUPPORT SYSTEM AND METHOD filed Apr. 15, 2015 (Qu et al.);

U.S. patent application Ser. No. 14/687,289 for SYSTEM FOR COMMUNICATION VIA A PERIPHERAL HUB filed Apr. 15, 2015 (Kohtz et al.);

U.S. patent application Ser. No. 29/524,186 for SCANNER filed Apr. 17, 2015 (Zhou et al.);

U.S. patent application Ser. No. 14/695,364 for MEDICATION MANAGEMENT SYSTEM filed Apr. 24, 2015 (Sewell et al.);

U.S. patent application Ser. No. 14/695,923 for SECURE UNATTENDED NETWORK AUTHENTICATION filed Apr. 24, 2015 (Kubler et al.);

U.S. patent application Ser. No. 29/525,068 for TABLET COMPUTER WITH REMOVABLE SCANNING DEVICE filed Apr. 27, 2015 (Schulte et al.);

U.S. patent application Ser. No. 14/699,436 for SYMBOL READING SYSTEM HAVING PREDICTIVE DIAGNOSTICS filed Apr. 29, 2015 (Nahill et al.);

U.S. patent application Ser. No. 14/702,110 for SYSTEM AND METHOD FOR REGULATING BARCODE DATA INJECTION INTO A RUNNING APPLICATION ON A SMART DEVICE filed May 1, 2015 (Todeschini et al.);

U.S. patent application Ser. No. 14/702,979 for TRACKING BATTERY CONDITIONS filed May 4, 2015 (Young et al.);

U.S. patent application Ser. No. 14/704,050 for INTERMEDIATE LINEAR POSITIONING filed May 5, 2015 (Charpentier et al.);

U.S. patent application Ser. No. 14/705,012 for HANDS-FREE HUMAN MACHINE INTERFACE RESPONSIVE TO A DRIVER OF A VEHICLE filed May 6, 2015 (Fitch et al.);

U.S. patent application Ser. No. 14/705,407 for METHOD AND SYSTEM TO PROTECT SOFTWARE-BASED NETWORK-CONNECTED DEVICES FROM ADVANCED PERSISTENT THREAT filed May 6, 2015 (Hussey et al.);

U.S. patent application Ser. No. 14/707,037 for SYSTEM AND METHOD FOR DISPLAY OF INFORMATION USING A VEHICLE-MOUNT COMPUTER filed May 8, 2015 (Chamberlin);

U.S. patent application Ser. No. 14/707,123 for APPLICATION INDEPENDENT DEX/UCS INTERFACE filed May 8, 2015 (Pape);

U.S. patent application Ser. No. 14/707,492 for METHOD AND APPARATUS FOR READING OPTICAL INDICIA USING A PLURALITY OF DATA SOURCES filed May 8, 2015 (Smith et al.);

U.S. patent application Ser. No. 14/710,666 for PRE-PAID USAGE SYSTEM FOR ENCODED INFORMATION READING TERMINALS filed May 13, 2015 (Smith);

U.S. patent application Ser. No. 29/526,918 for CHARGING BASE filed May 14, 2015 (Fitch et al.);

U.S. patent application Ser. No. 14/715,672 for AUGUMENTED REALITY ENABLED HAZARD DISPLAY filed May 19, 2015 (Venkatesha et al.);

U.S. patent application Ser. No. 14/715,916 for EVALUATING IMAGE VALUES filed May 19, 2015 (Ackley);

U.S. patent application Ser. No. 14/722,608 for INTERACTIVE USER INTERFACE FOR CAPTURING A DOCUMENT IN AN IMAGE SIGNAL filed May 27, 2015 (Showering et al.);

U.S. patent application Ser. No. 29/528,165 for IN-COUNTER BARCODE SCANNER filed May 27, 2015 (Oberpriller et al.);

U.S. patent application Ser. No. 14/724,134 for ELECTRONIC DEVICE WITH WIRELESS PATH SELECTION CAPABILITY filed May 28, 2015 (Wang et al.);

U.S. patent application Ser. No. 14/724,849 for METHOD OF PROGRAMMING THE DEFAULT CABLE INTERFACE SOFTWARE IN AN INDICIA READING DEVICE filed May 29, 2015 (Barten);

U.S. patent application Ser. No. 14/724,908 for IMAGING APPARATUS HAVING IMAGING ASSEMBLY filed May 29, 2015 (Barber et al.);

U.S. patent application Ser. No. 14/725,352 for APPARATUS AND METHODS FOR MONITORING ONE OR MORE PORTABLE DATA TERMINALS (Caballero et al.);

U.S. patent application Ser. No. 29/528,590 for ELECTRONIC DEVICE filed May 29, 2015 (Fitch et al.);

U.S. patent application Ser. No. 29/528,890 for MOBILE COMPUTER HOUSING filed Jun. 2, 2015 (Fitch et al.);

U.S. patent application Ser. No. 14/728,397 for DEVICE MANAGEMENT USING VIRTUAL INTERFACES CROSS-REFERENCE TO RELATED APPLICATIONS filed Jun. 2, 2015 (Caballero);

U.S. patent application Ser. No. 14/732,870 for DATA COLLECTION MODULE AND SYSTEM filed Jun. 8, 2015 (Powilleit);

U.S. patent application Ser. No. 29/529,441 for INDICIA READING DEVICE filed Jun. 8, 2015 (Zhou et al.);

U.S. patent application Ser. No. 14/735,717 for INDICIA-READING SYSTEMS HAVING AN INTERFACE WITH A USER'S NERVOUS SYSTEM filed Jun. 10, 2015 (Todeschini);

U.S. patent application Ser. No. 14/738,038 for METHOD OF AND SYSTEM FOR DETECTING OBJECT WEIGHING INTERFERENCES filed Jun. 12, 2015 (Amundsen et al.);

U.S. patent application Ser. No. 14/740,320 for TACTILE SWITCH FOR A MOBILE ELECTRONIC DEVICE filed Jun. 16, 2015 (Bandringa);

U.S. patent application Ser. No. 14/740,373 for CALIBRATING A VOLUME DIMENSIONER filed Jun. 16, 2015 (Ackley et al.);

U.S. patent application Ser. No. 14/742,818 for INDICIA READING SYSTEM EMPLOYING DIGITAL GAIN CONTROL filed Jun. 18, 2015 (Xian et al.);

U.S. patent application Ser. No. 14/743,257 for WIRELESS MESH POINT PORTABLE DATA TERMINAL filed Jun. 18, 2015 (Wang et al.);

U.S. patent application Ser. No. 29/530,600 for CYCLONE filed Jun. 18, 2015 (Vargo et al);

U.S. patent application Ser. No. 14/744,633 for IMAGING APPARATUS COMPRISING IMAGE SENSOR ARRAY HAVING SHARED GLOBAL SHUTTER CIRCUITRY filed Jun. 19, 2015 (Wang);

U.S. patent application Ser. No. 14/744,836 for CLOUD-BASED SYSTEM FOR READING OF DECODABLE INDICIA filed Jun. 19, 2015 (Todeschini et al.);

U.S. patent application Ser. No. 14/745,006 for SELECTIVE OUTPUT OF DECODED MESSAGE DATA filed Jun. 19, 2015 (Todeschini et al.);

U.S. patent application Ser. No. 14/747,197 for OPTICAL PATTERN PROJECTOR filed Jun. 23, 2015 (Thuries et al.);

U.S. patent application Ser. No. 14/747,490 for DUAL-PROJECTOR THREE-DIMENSIONAL SCANNER filed Jun. 23, 2015 (Jovanovski et al.); and U.S. patent application Ser. No. 14/748,446 for CORDLESS INDICIA READER WITH A MULTIFUNCTION COIL FOR WIRELESS CHARGING AND EAS DEACTIVATION, filed Jun. 24, 2015 (Xie et al.).

In the specification and figures, typical embodiments of the invention have been disclosed. The present invention is not limited to such exemplary embodiments. Unless otherwise noted, specific terms have been used in a generic and descriptive sense and not for purposes of limitation.

What is claimed is:

1. A user authentication system for authenticating a user in a computer environment, comprising:
an authentication database for storing an authentication object, the authentication object defined by a first plurality of three-dimensional vertices;
an augmented reality device, comprising:
a gesture analyzer configured to recognize a plurality of gestures performed by a user; and
an object renderer communicatively coupled to the gesture analyzer, the object renderer configured to:
(i) render a virtual three-dimensional object for display to the user;
(ii) modify the shape of the virtual three-dimensional object in any number of ways in a manner associated with each particular gesture performed by the user and render a modified virtual three-dimensional object while the user performs the plurality of gestures; and
(iii) provide a completed modified virtual three-dimensional object defined by a second plurality of three-dimensional vertices for authentication upon receiving a prompt indicating that the user is ready to authenticate the modified virtual three-dimensional object, the shape of the modified virtual three-dimensional object continuing to be modified in any number of ways in a manner associated with each particular gesture until receiving the prompt; and
a verification subsystem communicatively coupled to the augmented reality device and the authentication database, the verification subsystem configured to:
(i) compare the second plurality of three-dimensional vertices to the first plurality of three dimensional vertices; and
(ii) authenticate the user if the second plurality of three-dimensional vertices matches the first plurality of three-dimensional vertices by at least greater than a pre-defined threshold, the threshold level required for a successful authentication varying based at least in part on the number of vertices defining the authentication object and/or the number of vertices defining the modified three-dimensional object.

2. The user authentication system of claim 1, wherein the gesture analyzer is a three-dimensional depth sensor configured for converting a user's hand gesture into an associated change in the shape of the virtual three-dimensional object.

3. The user authentication system of claim 1, wherein the gesture analyzer is configured to allow the user to make a plurality of modifications to the shape of the virtual three-dimensional object before the virtual three-dimensional object having a modified shape is transmitted to the verification subsystem.

4. The user authentication system of claim 1, wherein the verification subsystem authenticates the user by transmitting an authentication signal to the computer environment.

5. The user authentication system of claim 1, wherein:
the virtual three-dimensional object comprises a plurality of three-dimensional vertices, each of which is associated with a position;
the authentication object comprises a plurality of three-dimensional vertices, each of which is associated with a position; and
the verification subsystem is configured to determine that the virtual three-dimensional object's modified shape matches the authentication object's shape if, for each vertex of the authentication object, there is a corresponding vertex of the virtual three-dimensional object vertex having the same position.

6. The user authentication system of claim 1, wherein:
the virtual three-dimensional object comprises a plurality of three-dimensional vertices, each of which is associated with a position;
the authentication object comprises a plurality of three-dimensional vertices, each of which is associated with a position;
the verification subsystem is configured to determine that the virtual three-dimensional object's modified shape matches the authentication object's shape if, for each of a predetermined percentage of vertices of the authentication object, there is a corresponding vertex of the virtual three-dimensional object having the same position.

7. The user authentication system of claim 1, comprising:
an input device configured for receiving a user identification from the user;
wherein the authentication object is associated with the user identification.

8. The user authentication system of claim 7, wherein the input device is a touchpad.

9. The user authentication system of claim 7, wherein the input device is a microphone.

10. The user authentication system of claim 7, wherein the shape of the virtual three-dimensional object initially rendered by the object renderer depends upon the user identification submitted by the user via the input device.

11. A user authentication system for authenticating a user in a computer environment, comprising:
an augmented reality device, comprising:
a gesture analyzer configured for recognizing a user's gestures;
an object renderer in communication with the gesture analyzer, the object renderer configured for (i) rendering a virtual three-dimensional object for display to the user (ii) modifying the shape of the virtual three-dimensional object in any number of ways based upon the recognized gestures and rendering a modified virtual three-dimensional object while the user performs the gestures;
an input device configured for receiving a user identification from the user;
an authentication database for storing an authentication object; and
a verification subsystem in communication with the augmented reality device, the input device, and the authentication database, the verification subsystem configured for (i) receiving the virtual three-dimensional object having a modified shape from the object renderer, (ii) receiving the authentication object from the authentication database, (iii) comparing the virtual three-dimensional object having a modified shape to the authentication object, and (iv) authenticating the user if the virtual three-dimensional object's modified shape matches the authentication object's shape;
wherein the authentication object is associated with the user identification;
wherein the gesture analyzer is configured to allow the user to make a plurality of modifications to the shape of the virtual three-dimensional object before the virtual three-dimensional object having a modified shape is transmitted to the verification subsystem;
wherein the virtual three-dimensional object having a modified shape is transmitted to the verification subsystem upon receiving a prompt indicating that the user is ready to authenticate the virtual three-dimensional object having a modified shape;

wherein the virtual three-dimensional object comprises a plurality of three-dimensional vertices, each of which is associated with a position;

wherein the authentication object comprises a plurality of three-dimensional vertices, each of which is associated with a position; and wherein the verification subsystem is configured to determine that the virtual three-dimensional object's modified shape matches the authentication object's shape if, for each of a predetermined percentage of vertices of the authentication object, there is a corresponding vertex of the virtual three-dimensional object having the same position, the predetermined percentage of vertices varying based at least in part on the number of positions.

12. A method of authenticating a user in a computer environment, comprising:

providing an authentication object defined by a first plurality of three-dimensional vertices;

rendering a virtual three-dimensional object for display to the user via an augmented reality device's object renderer;

recognizing a plurality of gestures performed by the user using the augmented reality device's gesture analyzer;

modifying the shape of the virtual three-dimensional object in any number of ways in a manner associated with each particular gesture performed by the user and rendering a modified virtual three-dimensional object while the user performs the plurality of gestures;

providing a completed modified virtual three-dimensional object defined by a second plurality of three-dimensional vertices upon receiving a prompt indicating that the user is ready to authenticate the modified virtual three-dimensional object, the shape of the modified virtual three-dimensional object continuing to be modified in any number of ways in a manner associated with each particular gesture until receiving the prompt;

comparing, via a verification subsystem, the second plurality of three-dimensional vertices to the first plurality of three dimensional vertices; and authenticating the user if the second plurality of three-dimensional vertices matches the first plurality of three-dimensional vertices by at least greater than a predefined threshold, the threshold level required for a successful authentication varying based at least in part on the number of vertices defining the authentication object and/or the number of vertices defining the modified three-dimensional object.

13. The method of claim 12, wherein the gesture analyzer is a three-dimensional depth sensor configured for converting a user's hand gesture into an associated change in shape of the virtual three-dimensional object.

14. The method of claim 12, wherein modifying the shape of the virtual three-dimensional object based upon the recognized gesture comprises making a plurality of modifications to the shape of the virtual three-dimensional object.

15. The method of claim 12, wherein:

the virtual three-dimensional object comprises a plurality of three-dimensional vertices, each of which is associated with a position; and the authentication object comprises a plurality of three-dimensional vertices, each of which is associated with a position.

16. The method of claim 15, wherein the verification subsystem is configured to determine that the virtual three-dimensional object's modified shape matches the authentication object's shape if, for each vertex of the authentication object, there is a corresponding vertex of the virtual three-dimensional object vertex having the same position.

17. The method of claim 15, wherein the verification subsystem is configured to determine that the virtual three-dimensional object's modified shape matches the authentication object if a pre-determined percentage of authentication object positions are the same as the virtual three-dimensional object positions.

18. The method of claim 12, comprising:

receiving a user identification via an input device;

wherein the authentication object is associated with the user identification.

19. The method of claim 18, wherein the input device is a touchpad.

20. The method of claim 18, wherein the input device is a microphone.

* * * * *